(12) United States Patent
Anderson et al.

(10) Patent No.: US 9,776,379 B2
(45) Date of Patent: Oct. 3, 2017

(54) ABSORBING SOLAR CONTROL INTERLAYERS

(71) Applicant: Pleotint, L.L.C., West Olive, MI (US)

(72) Inventors: Christopher D. Anderson, East Grand Rapids, MI (US); Harlan J. Byker, West Olive, MI (US); Samuel J. DeJong, Allendale, MI (US); Curtis J. Liposcak, Madison, WI (US)

(73) Assignee: PLEOTINT, L.L.C., West Olive, MI (US)

( * ) Notice: Subject to any disclaimer, the term of this patent is extended or adjusted under 35 U.S.C. 154(b) by 84 days.

(21) Appl. No.: 14/699,756

(22) Filed: Apr. 29, 2015

(65) Prior Publication Data

US 2015/0306848 A1      Oct. 29, 2015

Related U.S. Application Data

(60) Provisional application No. 61/985,713, filed on Apr. 29, 2014.

(51) Int. Cl.
*B32B 17/10* (2006.01)
*B32B 27/08* (2006.01)
(Continued)

(52) U.S. Cl.
CPC .. *B32B 17/10477* (2013.01); *B32B 17/10091* (2013.01); *B32B 17/10137* (2013.01); *B32B 17/10155* (2013.01); *B32B 17/10633* (2013.01); *B32B 17/10678* (2013.01); *B32B 17/10761* (2013.01); *B32B 27/08* (2013.01); *B32B 27/18* (2013.01); *B32B 27/22* (2013.01); *B32B 27/30* (2013.01); *B32B 27/36* (2013.01); *B32B 2264/10* (2013.01); *B32B 2307/71* (2013.01);
(Continued)

(58) Field of Classification Search
CPC .................. B32B 17/10477; G02F 1/0147
See application file for complete search history.

(56) References Cited

U.S. PATENT DOCUMENTS 2,952,575 A     9/1960  Baltzer
3,234,161 A     2/1966  Snelgrove et al.
(Continued)

FOREIGN PATENT DOCUMENTS

JP     H07-024957     1/1995
WO    2008/087077    7/2008

OTHER PUBLICATIONS

Webpage featuring "Efficient Windows Collaborative™", http://efficientwindows.org/shge.php (retrieved from the internet on Apr. 29, 2015).
(Continued)

*Primary Examiner* — Gregory Webb
(74) *Attorney, Agent, or Firm* — Thompson Hine LLP

(57) ABSTRACT

A thermochromic, near infrared (NIR) absorbing interlayer. The interlayer includes a NIR-absorbing substance dispersed or dissolved in a polymer matrix and a thermochromic material or system. The interlayer has an internal visible light transmission above 50% and an internal solar energy transmission below 55% when the interlayer is at 15° C. and an internal visible light transmission below 20% and an internal solar energy transmission below 20% when the interlayer is at 75° C. The internal haze of the interlayer is below 3.5%.

56 Claims, 14 Drawing Sheets

(51) Int. Cl.
*B32B 27/18* (2006.01)
*B32B 27/30* (2006.01)
*B32B 27/22* (2006.01)
*B32B 27/36* (2006.01)

(52) U.S. Cl.
CPC ... *B32B 2307/754* (2013.01); *B32B 2605/006* (2013.01)

(56) References Cited

U.S. PATENT DOCUMENTS

| | | | |
|---|---|---|---|
| 3,437,552 A | 4/1969 | Bowen et al. | |
| 3,718,535 A | 2/1973 | Armstrong et al. | |
| 3,962,488 A | 6/1976 | Gillery | |
| 4,226,910 A | 10/1980 | Dahlen et al. | |
| 4,782,216 A | 11/1988 | Woodard | |
| 4,973,511 A | 11/1990 | Farmer et al. | |
| 6,084,702 A | 7/2000 | Byker et al. | |
| 6,362,303 B1 | 3/2002 | Byker et al. | |
| 6,365,284 B1 | 4/2002 | Liposcak | |
| 6,391,400 B1 | 5/2002 | Russell et al. | |
| 6,446,402 B1 | 9/2002 | Byker et al. | |
| 6,929,864 B2 | 8/2005 | Fleming et al. | |
| 7,525,717 B2 | 4/2009 | Byker et al. | |
| 7,538,931 B2 | 5/2009 | Byker et al. | |
| 7,542,196 B2 | 6/2009 | Byker et al. | |
| 7,655,301 B2 | 2/2010 | Chonan et al. | |
| 7,817,328 B2 | 10/2010 | Millett et al. | |
| 7,830,583 B2 | 11/2010 | Neuman et al. | |
| 7,943,246 B2 | 5/2011 | Barton et al. | |
| 7,968,186 B2 | 6/2011 | Rymer et al. | |
| 8,018,639 B2 | 9/2011 | Byker et al. | |
| 8,083,847 B2 | 12/2011 | Takeda et al. | |
| 8,154,788 B2 | 4/2012 | Millett et al. | |
| 8,182,718 B2 | 5/2012 | Byker et al. | |
| 8,431,045 B2 | 4/2013 | Byker et al. | |
| 8,623,243 B2 | 1/2014 | Anderson et al. | |
| 2005/0131133 A1 | 6/2005 | Wong et al. | |
| 2006/0229406 A1 | 10/2006 | Silverman et al. | |
| 2007/0206263 A1 | 9/2007 | Neuman et al. | |
| 2008/0092456 A1 | 4/2008 | Millett et al. | |
| 2008/0100902 A1 | 5/2008 | Byker et al. | |
| 2008/0100903 A1* | 5/2008 | Byker | C09K 9/02 359/288 |
| 2008/0105851 A1 | 5/2008 | Byker et al. | |
| 2008/0106781 A1 | 5/2008 | Byker et al. | |
| 2009/0050855 A1 | 2/2009 | Majumdar et al. | |
| 2009/0176101 A1 | 7/2009 | Greenall et al. | |
| 2009/0283728 A1 | 11/2009 | Byker et al. | |
| 2009/0323162 A1 | 12/2009 | Fanton et al. | |
| 2010/0316846 A1 | 12/2010 | DeJong et al. | |
| 2011/0075244 A1 | 3/2011 | Millett et al. | |
| 2011/0102878 A1 | 5/2011 | McCarthy et al. | |
| 2012/0001134 A1 | 1/2012 | Byker et al. | |
| 2012/0125660 A1 | 5/2012 | Bright | |
| 2012/0138875 A1 | 6/2012 | Anderson et al. | |
| 2012/0292581 A1 | 11/2012 | Byker et al. | |
| 2013/0215490 A1 | 8/2013 | Donval et al. | |
| 2013/0229702 A1 | 9/2013 | Broekhuis et al. | |
| 2013/0278989 A1 | 10/2013 | Lam et al. | |
| 2013/0286461 A1 | 10/2013 | Broekhuis et al. | |
| 2014/0134367 A1 | 5/2014 | DeJong et al. | |
| 2014/0327952 A1 | 11/2014 | Anderson et al. | |
| 2015/0202846 A1* | 7/2015 | Byker | C23C 14/086 428/141 |

OTHER PUBLICATIONS

PCT, International Search Report and Written Opinion, International Application No. PCT/US2015/011776 (Apr. 13, 2015).
PCT, International Search Report and Written Opinion; Application No. PCT/US2015/028289 (Sep. 4, 2015).

* cited by examiner

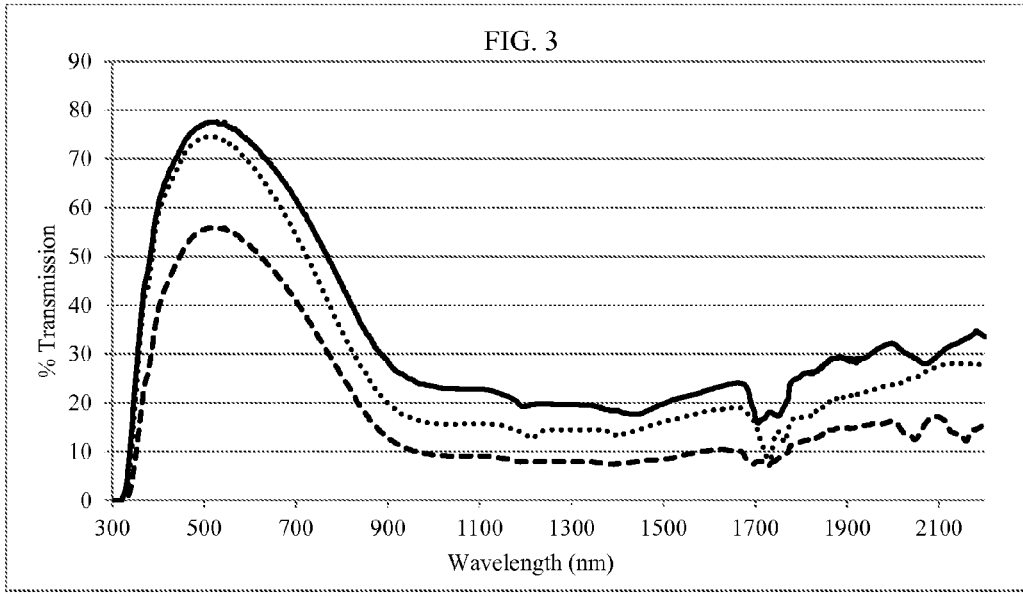
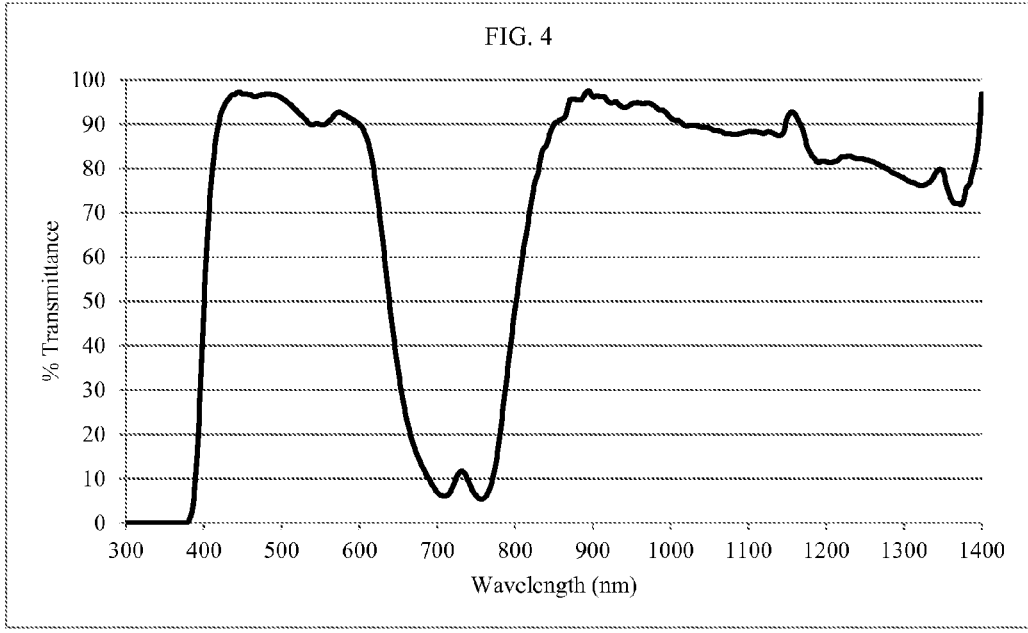

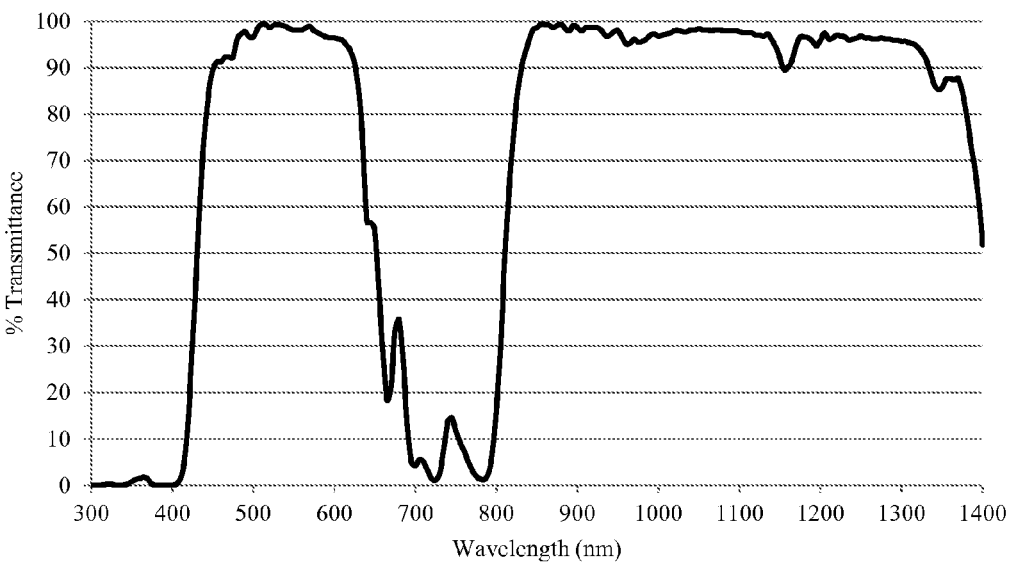
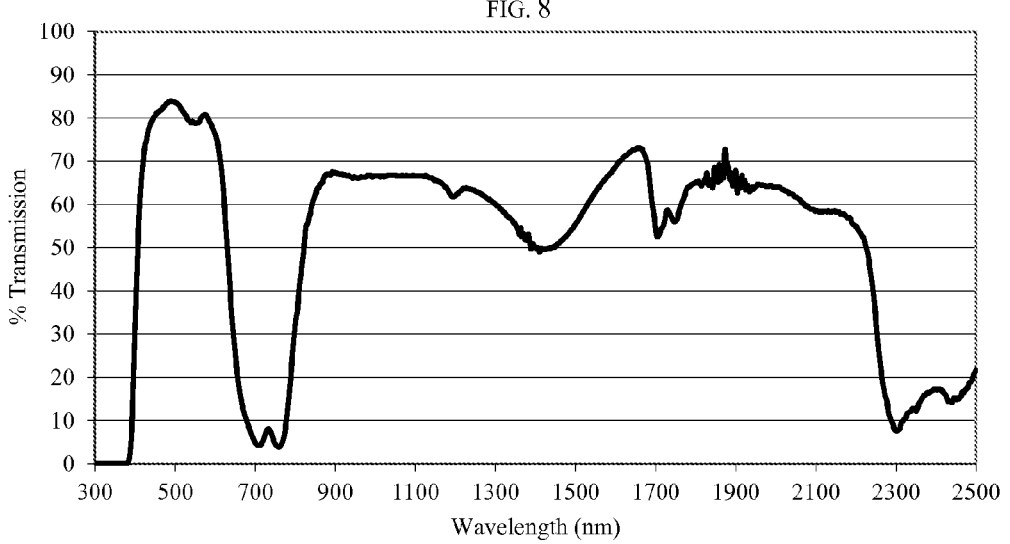

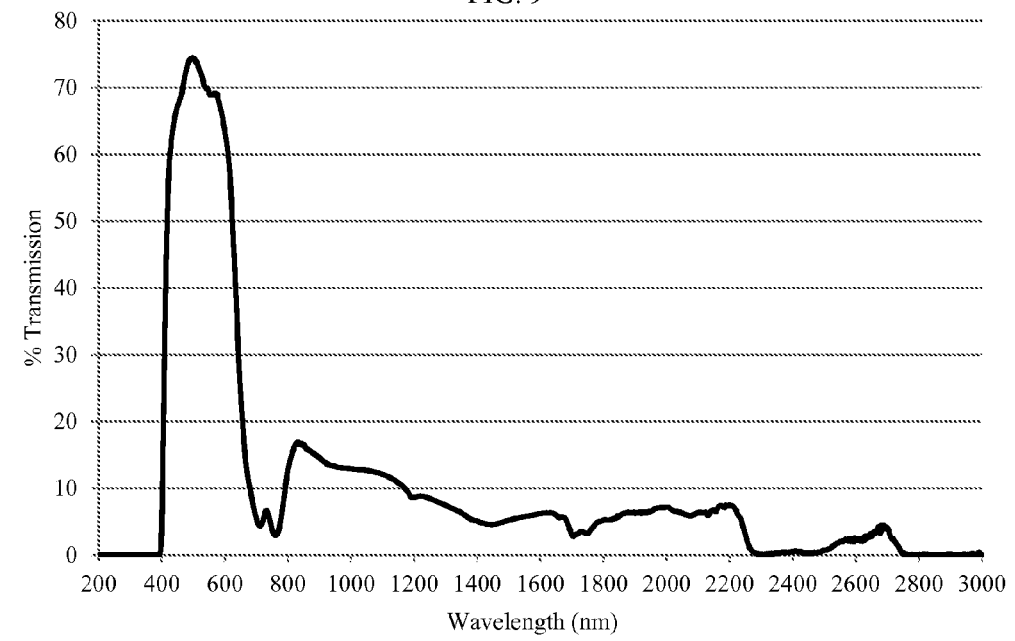
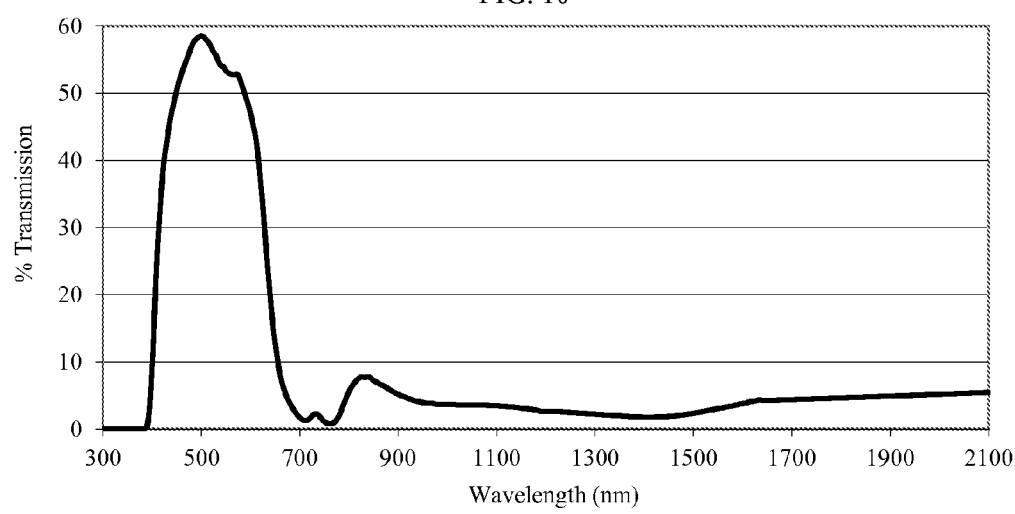

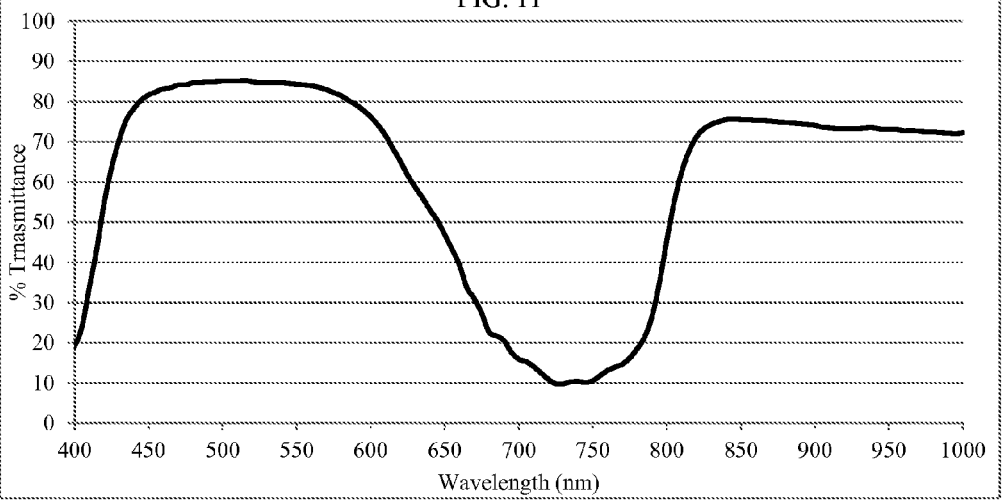
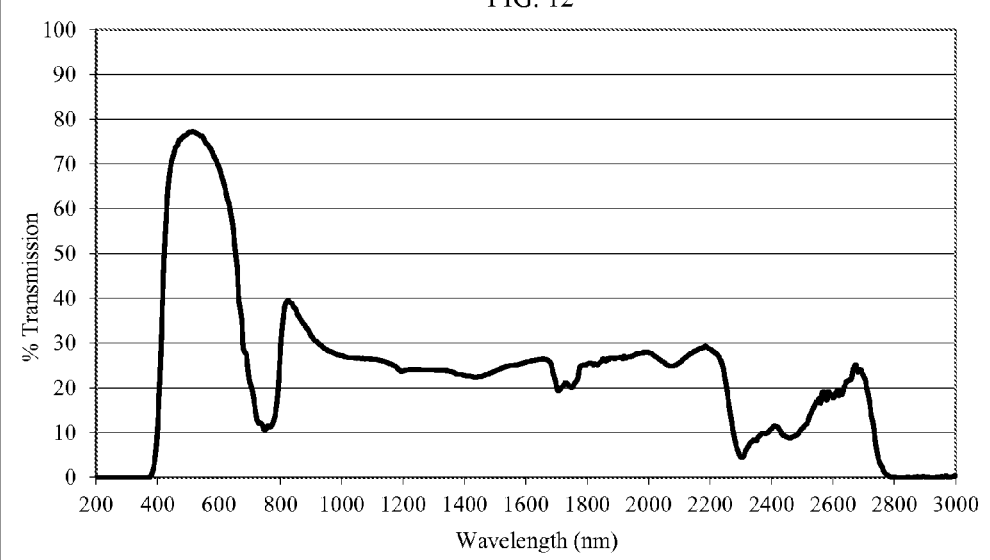

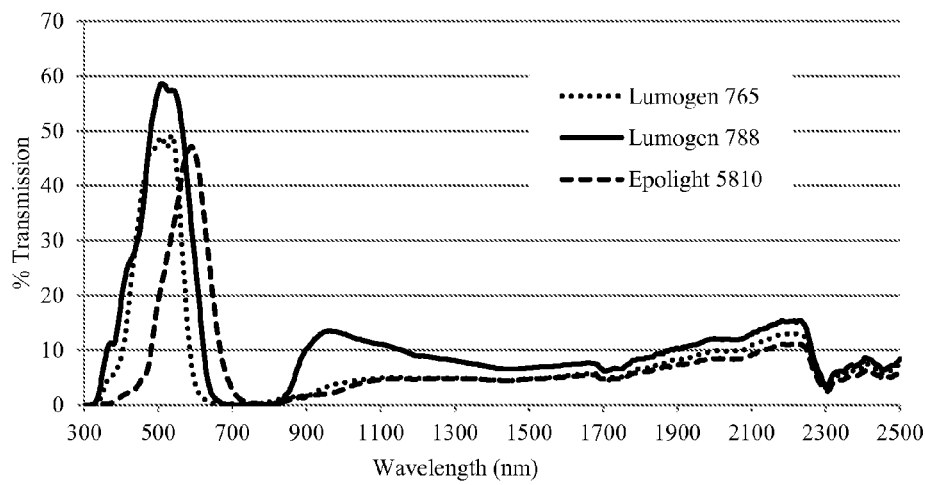
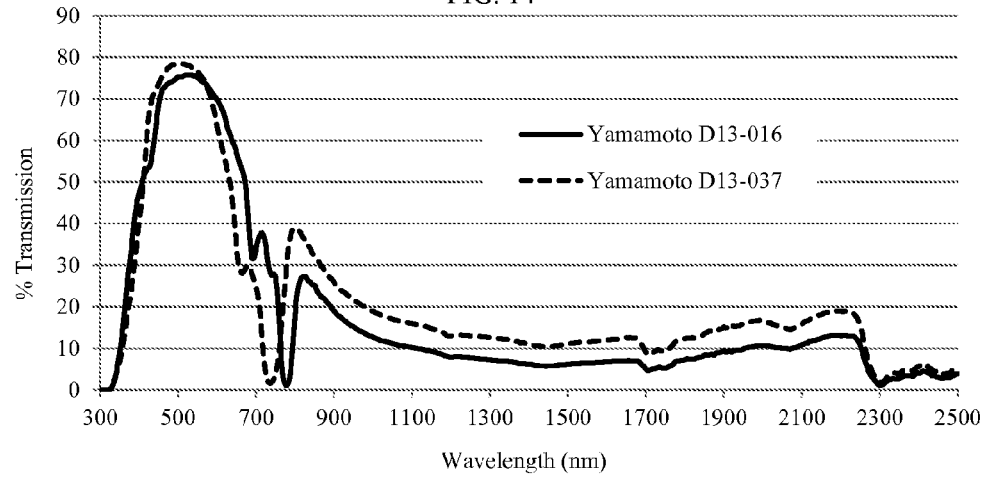

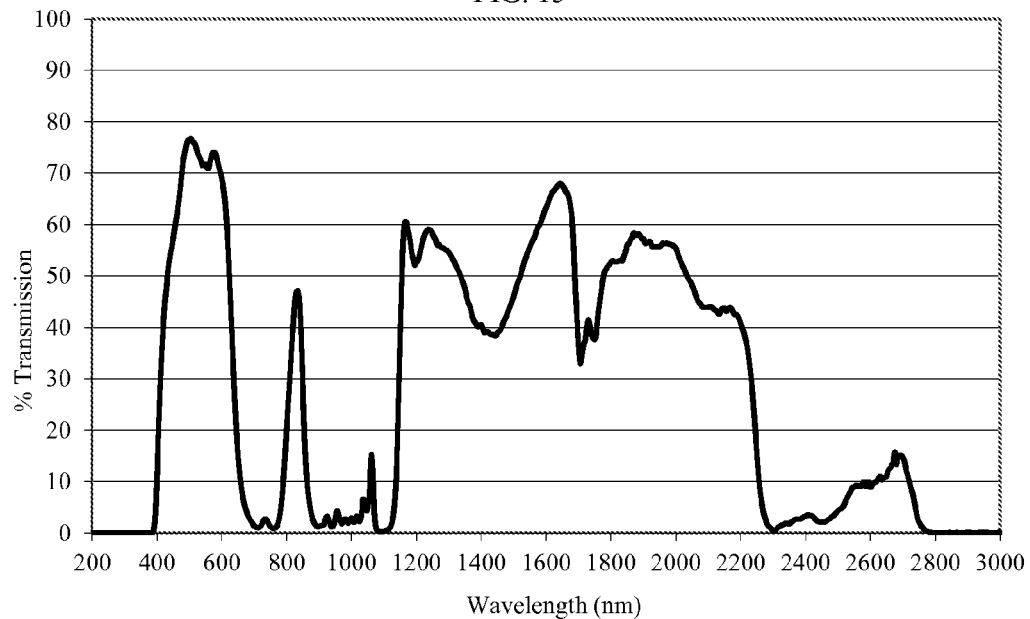
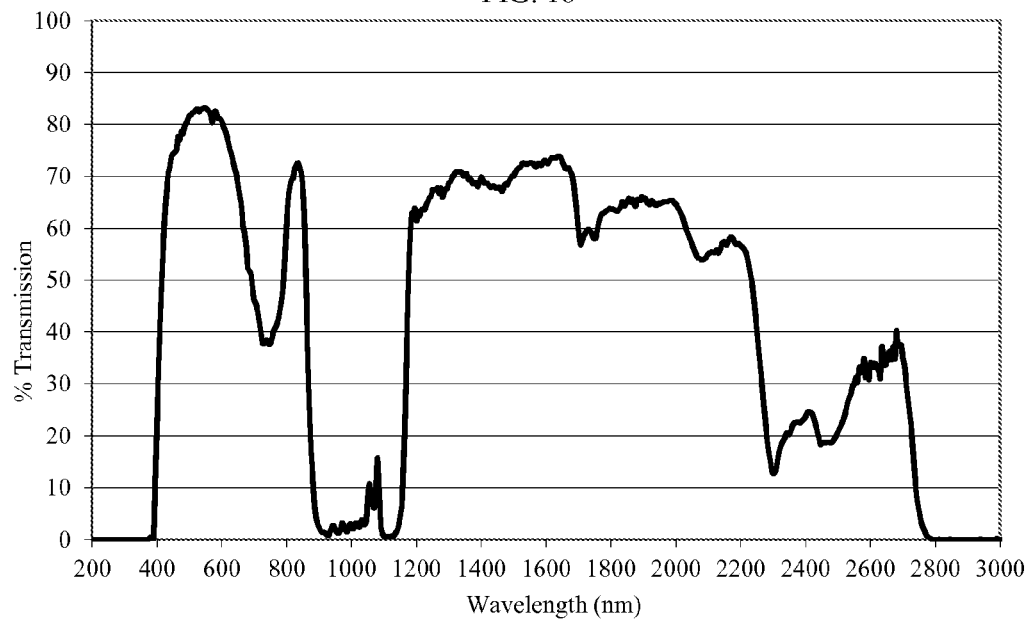

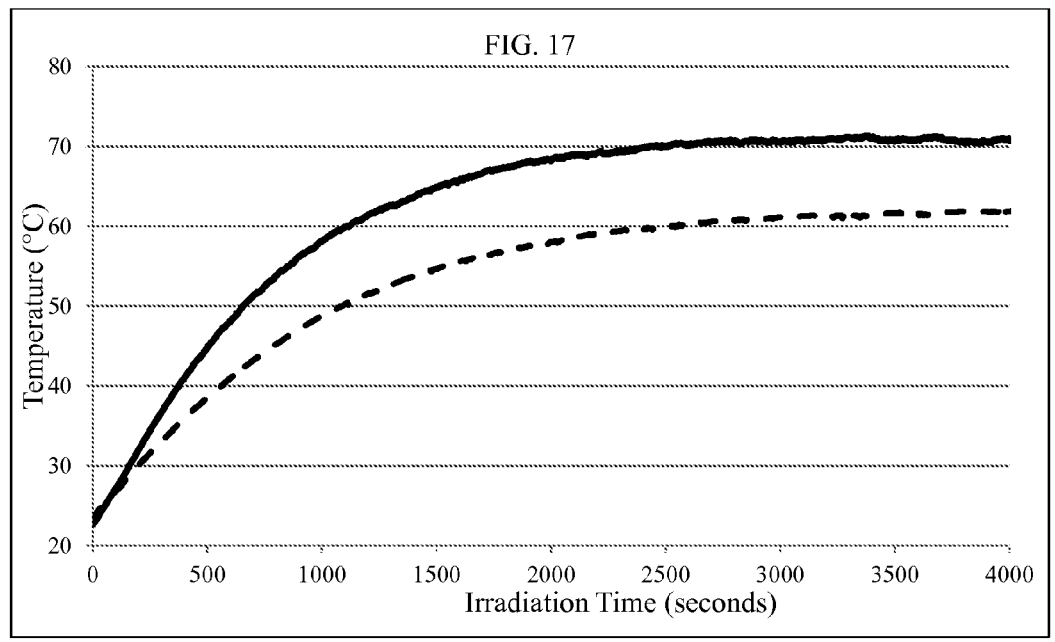
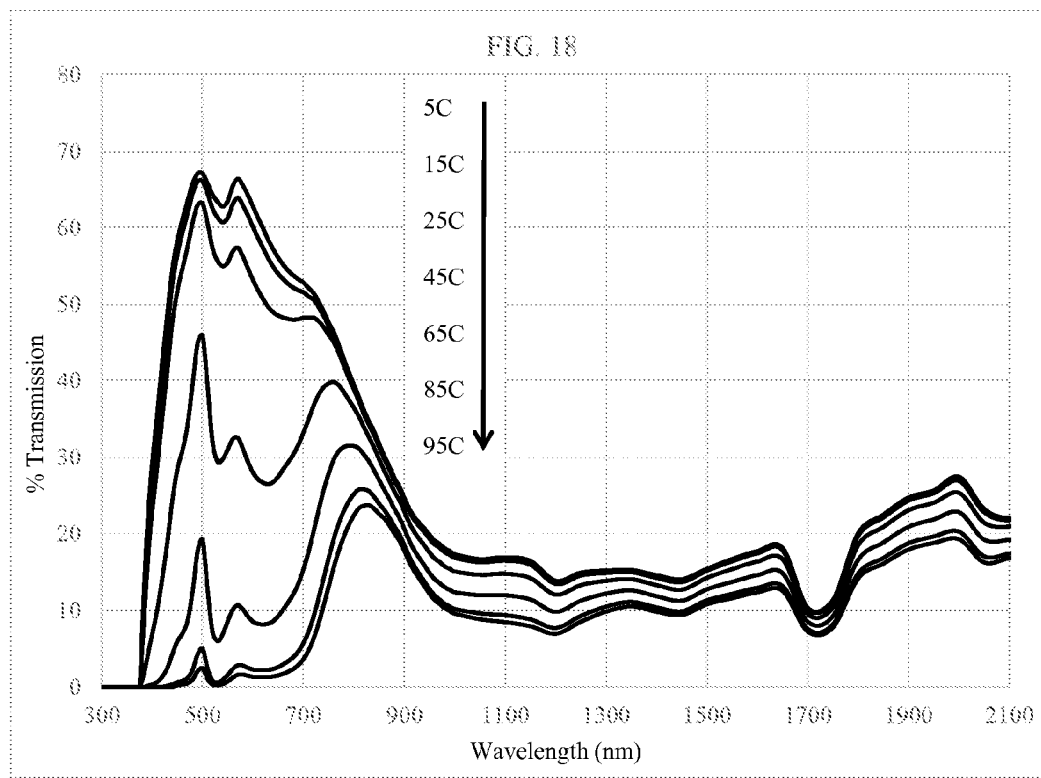

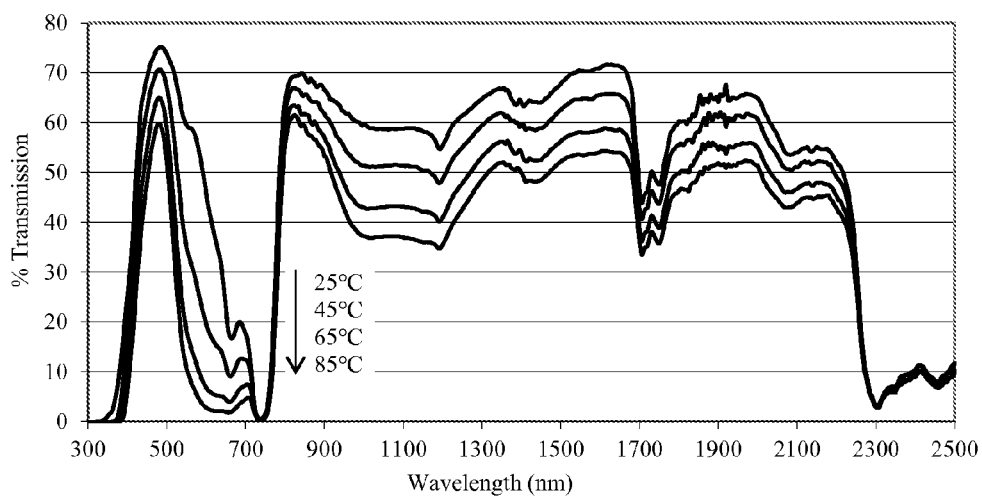
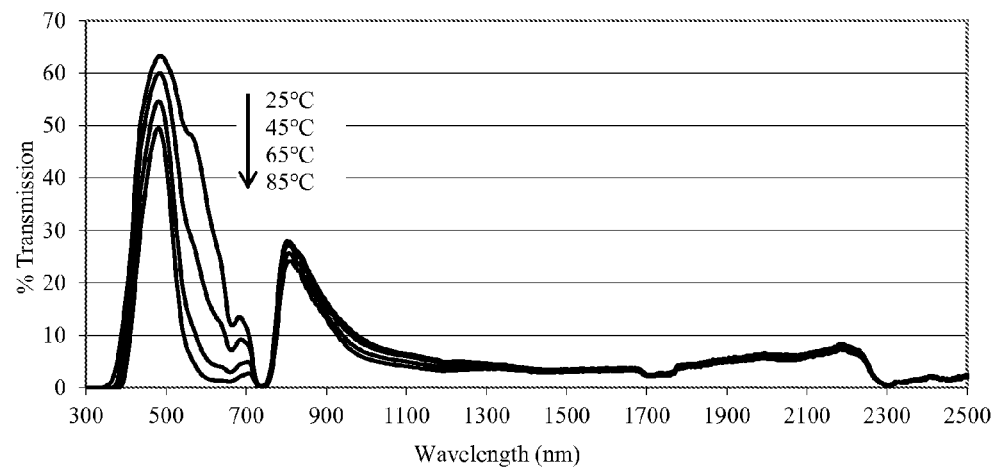

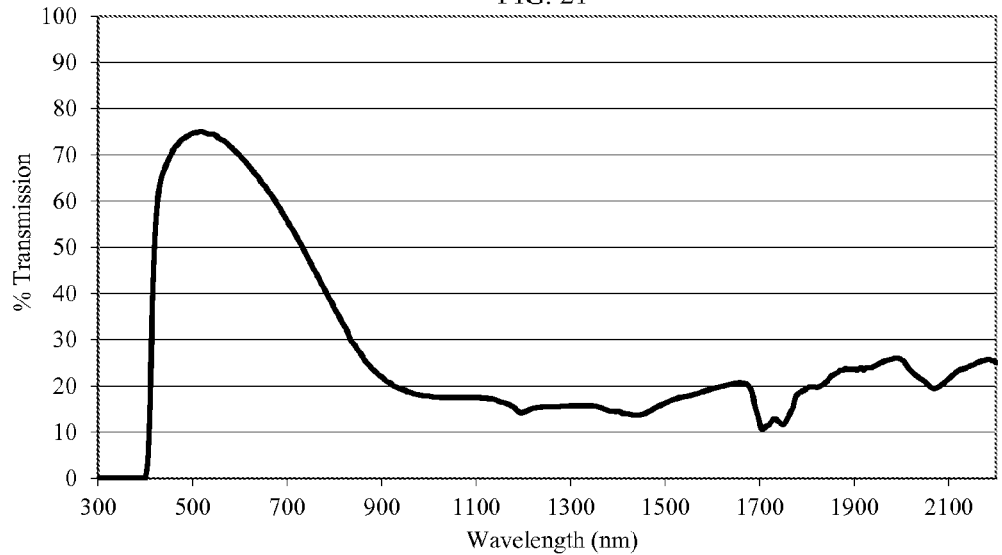
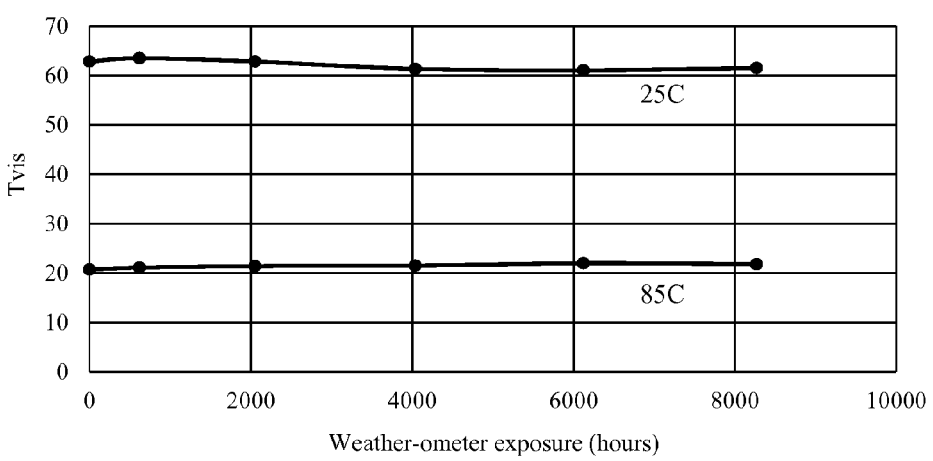

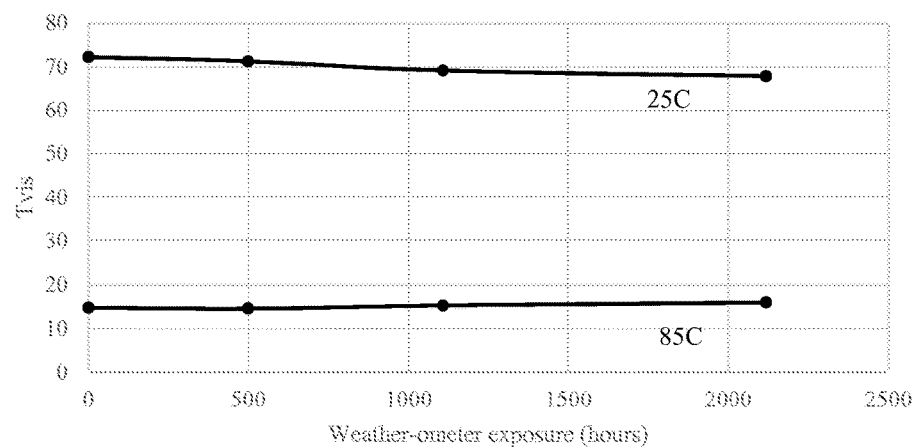
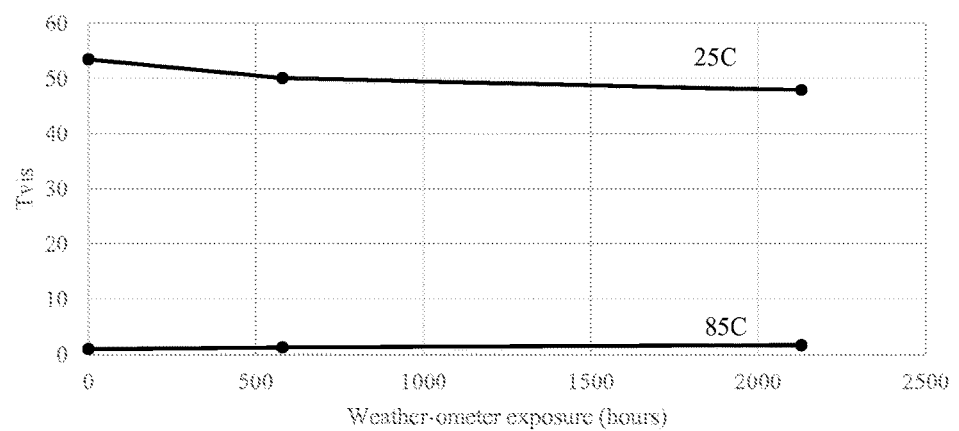

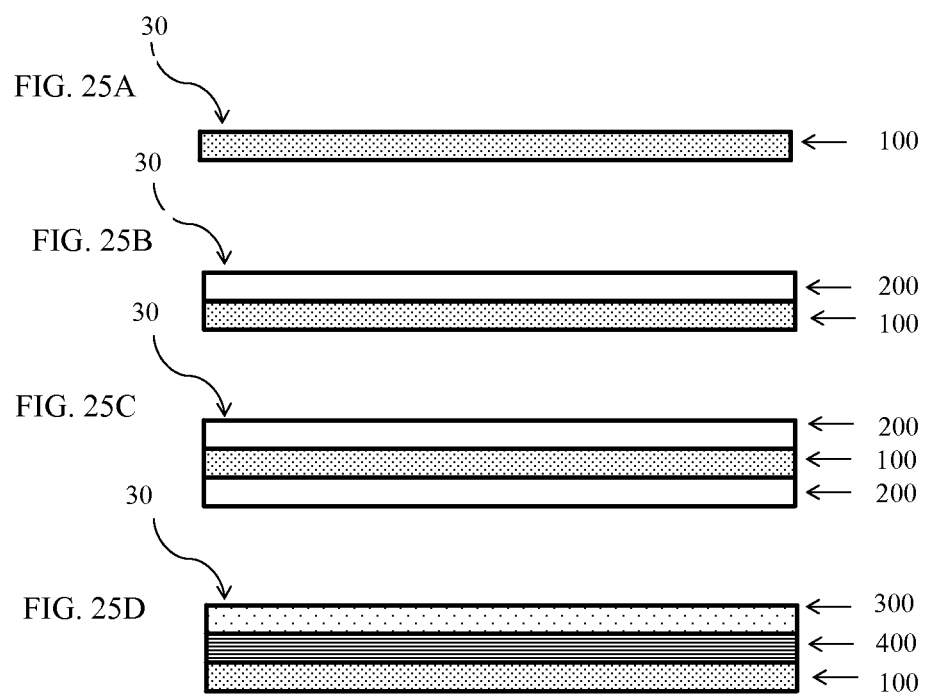

ABSORBING SOLAR CONTROL INTERLAYERS

CROSS-REFERENCE TO RELATED APPLICATIONS

The present application claims priority to U.S. Provisional Patent Application No. 61/985,713, filed Apr. 29, 2014, titled ABSORBING SOLAR CONTROL INTERLAYERS, the entirety of which is hereby incorporated by reference herein.

TECHNICAL FIELD

The invention relates to interlayer films and sheets and laminates containing such interlayer films and sheets. In particular, the invention relates to interlayer films and sheets including near infrared-absorbing materials.

BACKGROUND

Of the sun's energy that reaches the earth's surface, about 3% is ultraviolet radiation, (UV), about 47% is visible radiation, and about 50% is infrared radiation (which is mainly near infrared (NIR) radiation). In many applications where people are looking through a transparent layer, there is a desire to maintain adequate visible light transmission while minimizing both the UV transmission for its damaging effects and the NIR transmission for its potentially excessive heat load effects. This is the case in many window applications for buildings and motor vehicles.

SUMMARY

One aspect of the invention is an interlayer comprising a NIR-absorbing material and one or more than one of the following: a texture provided by embossing; a texture provided by melt fracture; the interlayer produced by extrusion with a twin screw extrusion line which includes a gear pump after the extruder; a polymer selected from polyvinylbutyral, poly(vinyl butyral-co-vinyl alcohol-co-vinyl acetate) silicone, ethylenevinylacetate, thermoplastic polyurethanes, and ionomeric polymers like poly(ethylene-co-methacrylic acid) layers which often incorporate ions such as lithium, sodium or zinc; a plasticizer in the interlayer; a color suppression additive in the interlayer; a light stabilizer material in the interlayer; a thermal stabilizer material in the interlayer; a thermochromic material in the interlayer; a LETC thermochromic system in the interlayer; a LETC thermochromic system insensitive to oxygen in the interlayer; multiple thermochromic layers separated by a separator layer; a separator layer which is comprised of multiple layers of alternating refractive index; a plastic film including multiple layers of alternating index of refraction (see U.S. application Ser. No. 13/771,285, the entirety of which is hereby incorporated by reference herein) in contact with the interlayer; and the combination of iodide and an antiyellowing agent in the interlayer; adhesion promoting agents or adhesion inhibiting agents in the interlayer; low water or moisture content in the interlayer; low haze in the interlayer; high visible light transmission with low solar energy transmission in the interlayer; sound deadening or acoustic properties in the interlayer; surfactants, dispersants, nanoparticle with surface treatments and/or synergists in the interlayer; careful gauge control of the interlayer or a high level of durability with regard to UV exposure for the interlayer.

One aspect of the invention is an interlayer including a NIR-absorbing material wherein the NIR absorbing material includes one or more than one of the following: NIR-absorbing nanoparticles; nanoparticles of cesium tungsten bronze or cesium tungsten oxide; nanoparticles of alkali metal (e.g., lithium or sodium) doped tungsten trioxide; NIR absorbing nanoparticles of indium oxide, tin oxide, indium tin oxide, antimony oxide, antimony tin oxide, antimony indium oxide, zinc oxide, cadmium oxide, aluminum doped zinc oxide, fluorine doped zinc oxide or fluorine doped tin oxide; NIR-absorbing material(s) that are dispersed in the interlayer; NIR-absorbing material(s) that are soluble in the interlayer; a tetrahalometalate NIR absorber; a combination of NIR-absorbing material(s) that are soluble in the interlayer and NIR-absorbing material(s) that are dispersed in the interlayer; a combination of NIR-absorbing material(s) that are soluble in the interlayer and NIR-absorbing nanoparticles; a combination of tetrahalometalate and nanoparticle NIR absorbers; NIR absorbing dyes; or NIR-absorbing that are an anthraisoquinoline, a naphthalocyanine dye or porphyradins dyes.

One aspect of the invention is laminate with an interlayer with any aspect of the invention included above and one or more than one of the following: rigid plastic sheets; strengthened glass; glass strengthened by mild heat strengthening, heat strengthening, tempering and chemical strengthening; glass with a low linear thermal expansion; bent glass; glass bent as matched pairs; low emissivity (low-e) coating; a hard coat low-e coating; a soft coat low-e coating; an antireflecting coating; a self-cleaning coating; or an edge seal around the perimeter of the laminate to protect the interlayer. One aspect of the invention is a window with a laminate with any aspect of the invention included above and one or more than one of the following: variable visible light transmission; variable solar heat gain; a high ratio of visible light transmission to low total solar transmission; increased sunlight responsiveness for thermochromic activity; useful at a sunroof; useful as a windshield; useful as a variable transmission thermochromic monopane; useful a pane of a double or triple pane window; use as a building window; or useful a motor vehicle window.

In one aspect, a thermochromic, near infrared (NIR) absorbing interlayer is disclosed. The interlayer includes a NIR-absorbing substance dispersed or dissolved in a polymer matrix and a thermochromic material or system. The interlayer has an internal visible light transmission above 50% and an internal solar energy transmission below 55% when the interlayer is at 15° C. and an internal visible light transmission below 20% and an internal solar energy transmission below 20% when the interlayer is at 75° C. The internal haze of the interlayer is below 3.5%.

In one aspect, a laminate is disclosed. The laminate includes an interlayer including an NIR-absorbing substance dispersed or dissolved in a polymer matrix, a first sheet of plastic or glass, and a second sheet of plastic or glass. The interlayer is bonded between the first sheet and the second sheet. At least one of the first sheet and the second sheet is coated with a low-e coating. The laminate has a visible light transmission above 70% and a total solar transmission below 35%.

In one aspect a laminate is disclosed. The laminate includes an interlayer including an NIR-absorbing substance dispersed or dissolved in a polymer matrix and a thermochromic material or system, a first sheet of heat strengthened glass, and a second sheet of heat strengthened glass. The interlayer is bonded between the first sheet and the second sheet.

Other aspects of the invention will be apparent to those skilled in the art based on the discussion and disclosures herein.

BRIEF DESCRIPTION OF THE DRAWINGS

FIG. 3 shows portions of the UV/Vis/NIR spectrum for a laminate in accordance with the invention made with an interlayer comprising NIR-absorbing CTB nanoparticles dispersed in Surlyn 9150 as a dotted line. FIG. 3 shows portions of the UV/Vis/NIR spectrum for a laminate made with an interlayer comprising NIR-absorbing CTB nanoparticles dispersed in thermoplastic polyurethane or TPU as a dashed line. FIG. 3 shows portions of the UV/Vis/NIR spectrum for a laminate made with an interlayer comprising NIR-absorbing CTB nanoparticles dispersed in PVB as a solid line.

FIG. 4 shows the spectrum for a solution of 0.005M $(TBA)_2NiBr_4$ and 0.18M TBABr in gamma-butyrolactone in a cuvette with a 1 cm path length versus a reference cuvette of pure gamma-butyrolactone. TBA represents the tetra(n-butyl)ammonium cation.

FIG. 7 shows the spectra for FIGS. 5 and 6 added together as if each of the NIR-absorbing systems were used as a separate NIR-absorbing layer in a single system and the transmitted light were passed through both layers.

FIG. 8 shows the transmission spectrum for a laminate in accordance with the invention with two pieces of 3 millimeter thick, clear, soda lime glass with an interlayer comprising 3 weight % $NiBr_2$, 38 weight % tetra(n-butyl)ammonium bromide and 59 weight % PVB.

FIG. 9 shows portions of the UV/Vis/NIR spectrum for a laminate in accordance with the invention made with a three layer interlayer comprising a PVB layer with dissolved tetrabromonickelate, a layer of PET as a separator and a layer of PVB comprising NIR-absorbing nanoparticles.

FIG. 10 shows portions of the ITN/Nis/NM spectrum for a laminate in accordance with the invention with an interlayer comprised of a combination of NIR-absorbing nanoparticles dispersed in triethylene glycol, bis(2-ethylhexanoate), Tinuvin® 405 and tetrabromonickelate dissolved in a single layer of PVB.

FIG. 11 shows a transmission spectrum for a laminate in accordance with the invention with an interlayer comprising about 0.44 weight % $CoBr_2$ and 12.4 weight % tetrabutylammonium iodide, 16.9 weight % triethylene glycol, 0.9 weight % Tinuvin® 405, 1.0 weight % di-tert-butyl hydroquinone, 0.9 weight % Irganox® 1010 and 67.4 weight % PVB laminated between two pieces of 3 millimeter thick clear, soda lime glass.

FIG. 12 shows portions of the UV/Vis/NIR spectrum for a laminate in accordance with the invention with an interlayer comprising a combination of NM-absorbing nanoparticles, tetrabromocobaltate and tetraiodocobaltate as NIR absorbers in a single layer of PVB laminated between two pieces of 3 millimeter thick clear, soda lime glass, FIG. 13 show the spectra for laminates in accordance with the invention made with interlayer comprising PVB and a combination of dispersed CTB nanoparticles with dissolved Lumogen 765 or dissolved Lumogen 788 or dissolved Epolight 5810 each laminated between two pieces of 3 millimeter thick, clear, soda lime glass.

FIG. 14 show the spectra for laminates in accordance with the invention made with interlayer comprising PVB and a combination of dispersed CTB nanoparticles with dissolved Yamamoto D13-016 or dissolved Yamamoto D13-037 each laminated between two pieces of 3 millimeter thick clear, soda lime glass.

FIG. 15 shows the spectrum for a laminate in accordance with the invention made with an interlayer comprising a layer of PVB comprising tetrabromonickelate, a layer UCSF and another layer of PVB comprising tetrabromonickelate laminated between two pieces of 3 millimeter thick, soda lime glass.

FIG. 16 shows the spectrum for a laminate in accordance with the invention made with an interlayer comprising a layer of PVB comprising tetrabromocobaltate and tetraiodocobaltate, a layer UCSF and another layer of PVB comprising tetrabromocobaltate and tetraiodocobaltate laminated between two pieces of 3 millimeter thick clear, soda lime glass.

FIG. 17 shows the heating rate and temperatures observed for laminates in accordance with the invention with interlayers that comprise thermochromic films with (solid line) and without (dashed line) CTB nanoparticles.

FIG. 18 shows the spectra for a laminate in accordance with the invention at various temperatures where the laminate has a three layer interlayer comprising a first PVB layer with a dissolved LETC system which darkens to dark orange which contains nickel and iodide as key components, a second layer of PET as a separator and a third layer which comprises PVB with a combination of dispersed CTB nanoparticles and a dissolved LETC system which darkens to dark blue containing nickel and bromide as key components.

FIG. 19 shows the spectra for a laminate in accordance with the invention at various temperatures where the interlayer comprises PVB with a dissolved LETC system which darkens to dark blue containing nickel and bromide as key components combines a bromide based LETC system and dissolved Yamamoto D13-037 as NIR absorber.

FIG. 20 shows the spectra for a laminate in accordance with the invention at various temperatures where the interlayer comprises PVB with dispersed CTB NIR-absorbing nanoparticles, a dissolved LETC system which darkens to dark blue containing nickel and bromide as key components combines a bromide based LETC system and dissolved Yamamoto D13-037 as NIR absorber.

FIG. 21 shows the spectrum for a laminate in accordance with the invention where the PVB layer incorporating NIR-absorbing nanoparticles is an acoustic PVB interlayer.

FIG. 22 shows the durability observed for a laminate in accordance with the invention with an interlayer which comprises PVB with a combination of dispersed CTB nanoparticles and a dissolved LETC system which darkens to dark blue containing nickel and bromide as key components.

FIG. 23 shows the durability observed for a laminate in accordance with the invention with an interlayer which comprises a layer with a combination of dispersed CTB nanoparticles and a dissolved LETC system which darkens to dark orange which contains nickel and iodide as key components.

FIG. 24 shows the durability observed for a laminate in accordance with the invention with a three layer interlayer which comprises a first layer of PVB with a dissolved LETC system which darkens to dark orange which includes nickel and iodide as key components, a second layer of PET as a separator and a third layer which comprises PVB with a combination of dispersed CTB nanoparticles and a dissolved LETC system which darkens to dark blue containing nickel and bromide as key components.

FIG. 25A shows a structure and configuration for an interlayer in accordance with the invention.

FIG. 25B shows a structure and configuration for an interlayer in accordance with the invention.

FIG. 25C shows a structure and configuration for an interlayer in accordance with the invention.

FIG. 25D shows a structure and configuration for an interlayer in accordance with the invention.

DETAILED DESCRIPTION

Figure 1:
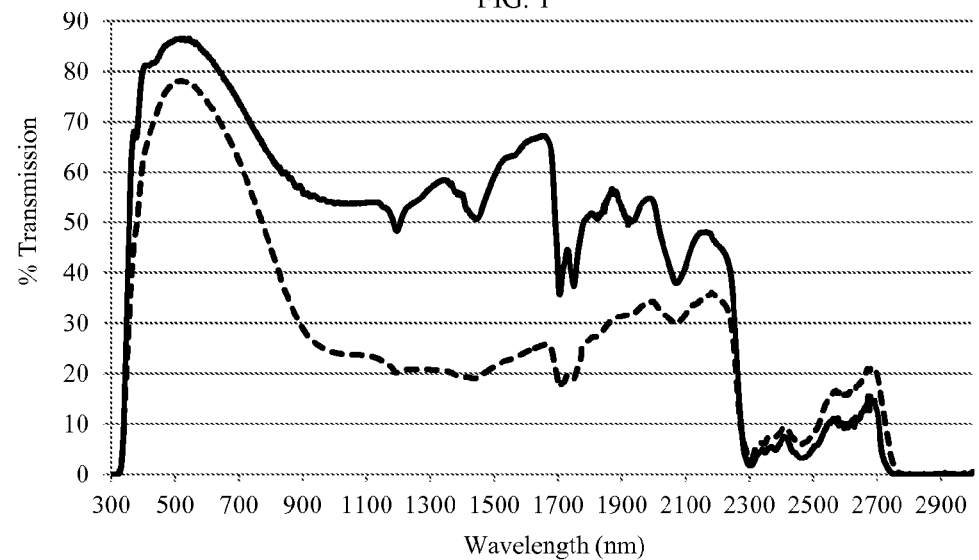
FIG. 1 shows portions of the UV/Vis/NIR spectrum for a laminate in accordance with the invention including an interlayer without added NIR-absorbing materials as a solid line and a portion of the UV/Vis/NIR spectrum of a laminate comprising an interlayer with NIR-absorbing CTB nanoparticles as a dashed line.

While the definition of light might be restricted by some to the visible electromagnetic radiation that can be seen, in this disclosure, the word "light" as used in this disclosure includes the UV electromagnetic radiation and the NIR electromagnetic radiation of the sun that reaches the earth's surface as well as the visible portion, except as otherwise specified.

UV light may be blocked by selective absorbers of the UV wavelengths of radiation in at least one layer within a window structure. Selective UV absorbers include certain metal oxides, metal-organic compounds, and organic UV absorbers. Organic UV absorbers often serve a dual purpose as UV stabilizers for polymeric films and layers.

The NIR light may be absorbed by selective absorbers of NIR, but relatively few materials absorb significantly in the NIR range without absorbing significant visible light as well. For the invention described herein, NIR-absorbing materials and substances refer to materials and substances that absorb substantially more NIR than visible light. Some useful selective NIR-absorbing materials include certain organic and metal-organic dyes such as Lumogen IR® 765 or 788 from BASF of Ludwigshafen, Germany or Epolight 5810® available from Epolin of Newark, New Jersey, that may be incorporated into polymeric films and layers. Lumogen 765 is an anthraisoquinoline dye, Epolight 5810 is a naphthalocyanine dye, and Yamamoto D13-037 and D13-016 are porphyradins dyes available from Yamamoto Chemicals, Inc., of Tokyo, Japan. These organic and metal-organic dyes often have limited stability when exposed to sunlight but generally have the advantage that they can dissolve in polymer and plastic layers and thereby provide haze free or very low haze layers. Selective NIR absorbers also include certain metal oxides such as cerium oxide which may be incorporated into the composition of a glass substrate, as in the case of Azuria® glass from PPG or Evergreen® glass from Pilkington. Selective NIR absorbers also include certain metal oxide thin films on a substrate such as glass or plastic. Selective NIR absorbers also include nanoparticles of certain inorganic materials which may be dispersed in a polymer matrix.

NIR-absorbing nanoparticles of particular interest include indium oxide, tin oxide, indium tin oxide, antimony oxide, antimony tin oxide, antimony indium oxide, zinc oxide, cadmium oxide, aluminum doped zinc oxide, fluorine doped zinc oxide, fluorine doped tin oxide, tungsten oxide, doped tungsten oxides, tungsten bronzes including those of alkali or alkaline earth metals, lanthanum hexaboride and combinations of these materials in the composition of the nanoparticles themselves. Also, a substrate or matrix may contain any possible mixture of two or more than two of any of the NIR-absorbing material types described herein. Nanoparticles are of particular interest when they are small enough and dispersed well enough to minimize light scattering. Yet they may have absorption characteristics that are at least similar to or improved on as compared to the bulk material of which the nanoparticle is formed. Dispersing nanoparticles and/or combinations of NIR-absorbing materials which are dispersed and/or dissolved in a polymeric or plastic layer provides a cost effective way to provide NIR absorption in a window, as compared to providing layers of absorbing materials as a coating on glass or on a plastic substrate.

As used herein, the term "dispersion" refers to a matrix including particulates that are not dissolved therein, and the term "solution" refers to a matrix including substances that are dissolved therein. Nanoparticles which are not dissolved may be uniformly and permanently dispersed in a matrix, especially a highly viscous or solid matrix like a polymer or plastic layer. A highly viscous or solid matrix like a polymer or plastic layer may act as a solvent and dissolve certain other substances. We disclose herein a number of novel and sunlight-durable combinations of dispersed and dissolved NIR-absorbing materials and substances.

The use of nanoparticles as NIR absorbers is disclosed in U.S. Pat. No. 2,952,575 "Near Infrared Spectrum Filter Media," to Donald H. Baltzer, assigned to Monsanto Chemical Company of St. Louis, Missouri, the entirety of which is hereby incorporated by reference herein. This patent discloses near infrared shielding dispersions of sodium-tungstate particles, preferably in the 40-200 "millimicron" size range dispersed in polyvinyl butyral resin. Also disclosing nanoparticles as NIR absorbers are U.S. Pat. No. 7,655,301 "Laminated Structure for Shielding Against Solar Radiation," to Takeshi Chonan and Kenji Adachi, assigned to Sumitomo Metal Mining Co., Ltd., the entirety of which is hereby incorporated by reference herein, and U.S. Pat. No.

8,083,847 "Fine Particle Dispersion of Infrared-shielding Material, Infrared-shielding Body, and Production Method of Fine Particles of Infrared-shielding Material and Fine Particles of Infrared-shielding Material" to Hiromitsu Takeda and Kenji Adachi, assigned to Sumitomo Metal Mining Co., Ltd., the entirety of which is hereby incorporated by reference herein.

Preferred nanoparticles are cesium tungsten bronze (CTB) nanoparticles, available from Nanophase Technologies Corporation of Romeoville, Illinois. Also preferred are similar materials known as cesium tungsten oxides (CWO) available from Sumitomo Metals and Mining of Tokyo, Japan. These CTB and CWO nanoparticles have a particularly large NIR absorbance relative to their small visible light absorbance. Also, when properly dispersed in polymer layers or films, these nanoparticle dispersions have low levels of light scattering or haze. For films that are about 0.75 millimeters thick, the preferred loadings of CTB or CWO nanoparticles are between 0.005 and 0.5 weight %. In general, a loading level that is independent of thickness is between about 10 and about 100 milligrams of CTB or CWO nanoparticles per square foot of film, interlayer, laminate, or window pane.

Commonly used polymer substrates, interlayers, or matrices into which nanoparticles and other NIR absorbers may be dispersed and/or dissolved include poly(vinyl butyral) (PVB), silicone, ethylenevinylacetate (EVA), thermoplastic polyurethanes (TPUs), and ionomeric polymers like poly(ethylene-co-methacrylic acid) layers which often incorporate ions such as lithium, sodium, or zinc. We have demonstrated that large NIR absorbance, low visible light absorbance, and low levels of haze may be obtained with CTB or CWO nanoparticles dispersed in a variety of these polymer substrates, interlayers, or matrices.

To minimize haze and maximize NIR absorption with nanoparticles, the desired NIR-absorbing nanoparticles are highly dispersed and as much as possible they are monodispersed by breaking up agglomerates. Also, the nanoparticles are preferably uniformly dispersed and distributed throughout the matrix provided by the polymer and any additives that make up the plastic film or sheet. To achieve this, the nanoparticles typically have surface treatments. In addition, additives like surfactants, dispersants, and synergists may be chosen as are suitable for each specific matrix or polymer system into which the nanoparticles are incorporated. The dispersions and distributions may be achieved with high speed or high shear blenders and various attrition methods known in the art. For films and sheets that contain plasticizers, it is preferable to first disperse and distribute the nanoparticles in the plasticizer or other material that can be added to the polymer system, and then disperse and distribute this nanoparticle-plasticizer dispersion in the polymer, for example by liquid injection of the nanoparticle-plasticizer dispersion into the polymer stream of a twin screw extruder. The twin screw extruder is highly effective in dispersing and distributing the nanoparticle-plasticizer dispersion throughout the polymer system. The extrudate with the dispersed nanoparticles preferably passes through a gear pump after exiting the twin screw extruder so consistent pressure is provided to the die in which the film or sheet is formed and exits through the die lips.

We have discovered that when a polymer material containing virtually any type of NIR materials with substantial NIR absorption is used to laminate sheets of glass together, and that laminate is exposed to direct sunlight, it is preferred that that the glass be strengthened or that the glass have a low linear thermal expansion coefficient (for example between about $4\times10^{-6}$/K and about $1\times10^{-7}$/K). This is important so that when the laminate is exposed to and heated by sunlight it will not easily break, as would be the case for annealed glass, especially annealed soda lime glass. Any of the glass types used in the laminates of the invention may be strengthened or toughened by a heat treatment process that results in a mild increase in surface compressive stress or a large increase in surface compressive stress like heat strengthening or fully tempering the glass. Alternatively, the glass may be chemically strengthened. Substrates for laminates like low thermal expansion glass or toughened glass may be provided, for example, by various types of borosilicate, aluminosilicate, or boroaluminosilicate glass, including untreated or chemically strengthened aluminosilicate glasses, various alkali-boroaluminosilicate glasses, or various alkali-aluminosilicate glasses.

Automobile windshields are not normally heat-strengthened or tempered other than the small amount of strengthening that may occur as part of the bending process. Surface compressive stress in typical windshield glass is in the neighborhood of 400 pounds per square inch, (psi). For windshields or other motor vehicle windows that are laminated with an interlayer loaded with NIR-absorbing materials, we have discovered that it is preferred that the glass be intentionally strengthened. In general, glass is considered fully tempered if its surface compressive stress is above 10,000 psi, and it is considered heat-strengthened if its surface compressive stress is in the range of about 3,500 to 7,500 psi. However, windshields are often produced with thin glass where it is difficult to achieve surface compressive stress in this range. Mildly heat-strengthened glass prepared by heat treating or strengthening to the lower surface compressive stress levels that may be achieved with thinner glass can still be effective in minimizing thermally induced glass breakage that occurs when thinner glass sheets are laminated together with the NIR-absorbing interlayers disclosed herein and then exposed to sunlight. This is especially important for solar control motor vehicle windshields and windows with thin glass and NIR-absorbing interlayers. As used herein, "mildly heat-strengthened glass" as heat treated glass with a surface compressive stress in the range of about 1,000 to 3,500 psi. This glass may be effective in minimizing glass breakage due to thermal stress, for example due to sunlight exposure of a laminate with the interlayers disclosed herein. In addition, careful edge treatment of the glass may help prevent thermal breakage. Preferred edge treatment processes include mechanical grinding, mechanical polishing, laser cutting, and/or flame polishing or flame annealing prior to strengthening.

When the interlayer of a laminate includes NIR-absorbing materials and the laminate is heated by exposure to sunlight, there is often a desire to reject that heat to the outside of a vehicle or building. This heat rejection is aided by the presence of a hard coat low-e coating on the interior side of the laminate if the laminate is used in a monolithic window pane applications, or by a hard coat or a soft coat low-e coating if the laminate is part of an insulated glass unit (also known as a double pane or thermal pane window glass unit). Preferred hard coat low-e coatings include fluorine doped tin, fluorine doped zinc oxide, tin doped indium oxide (ITO), or aluminum doped zinc oxide. Preferred soft coat low-e coatings include thin layers of silver metal and silver metal alloys antireflected with thin layers of high index of refraction materials or dielectric materials like metal oxide, nitrides, and carbides.

An advantageous combination is provided by two sheets of heat-strengthened glass (surface compressive stress of about 3,500 to 7,500 psi), or mildly heat strengthened glass (surface compressive stress of about 1,000 to 3,500 psi), or a heat-strengthened sheet of glass and a mildly heat-strengthened sheet of glass, where the sheets are laminated together with an interlayer containing NIR-absorbing materials like CTB or CWO nanoparticles (or one or more other types of dispersed and/or dissolved NIR-absorbing substances or materials), and where at least one of the sheets of glass having been coated with a low-e coating. This combination shows particular advantage when the low-e coating is on the interior or inboard-most surface of the laminate, in which case this combination provides excellent solar control by absorbing NIR and radiating a majority of the heat as long wavelength IR to the outside of a vehicle or building, with much less chance of glass breakage due to heating, especially breakage from localized heating of the laminate by sunlight exposure.

For a motor vehicle windshield, advantageous combinations include two sheets of heat-strengthened glass, two sheets of mildly heat-strengthened glass, or two sheets glass which are edge treated and optionally strengthened, where the sheets are laminated together with an interlayer containing NIR-absorbing materials like CTB or CWO nanoparticles (or one or more other types of nanoparticles and/or other NIR absorbers), and where the inboard sheet of glass has a hard coat low-e coating on its interior surface. Alternately, the inboard sheet of glass may have an anti-lacerative film applied to the interior surface, and the anti-lacerative film may optionally be coated with a low-e coating or a hard coat layer on the interior side of the anti-lacerative film. In this case, the low-e coating may serve the additional function as the hard coat or abrasion-resistant coating.

Some motor vehicle windshields and even some other motor vehicle windows have a requirement for at least some minimum visible light transmission level. Thus, another advantageous combination is to provide antireflecting coatings on the outside surfaces of one or both surfaces of the laminate to increase transmission by decreasing reflection losses of the laminate. For example, an antireflective coating or set of coatings may be provided on the outside surface or surfaces, and a low-e coating may be provided on an inside surface. Alternatively the antireflective coating or set of coatings may be provided on an outside surface and an anti-lacerative layer with an optional low-e may be provided on the inside of the laminate. Alternatively the antireflective coating or set of coatings may be provided on both an outside and an inside surface. The exterior surface of the glass itself, or the exterior layer of the antireflective coating or set of coatings, may comprise a thin layer (such as certain forms of titanium dioxide), which provides a self-cleaning effect. In any case where an antireflective coating or set of coatings is used, the interlayer may include additional NIR-absorbing materials for increased solar control as compared to a laminate without antireflective coatings, while still meeting certain minimum visible light transmission requirements.

U.S. Pat. Nos. 6,084,702 and 6,446,402, the entireties of which are hereby incorporated by reference herein, disclose the advantages of using thermochromic layers between sheets of bent glass as compared to other variable transmission technologies (such as electrochromic or suspended particle-based devices), for making dynamic, solar control windows with bent glass. However, we have discovered that a significant advantage is achieved with solar control interlayer and laminates with NIR absorbers in the interlayer and solar control interlayers and laminates that combine NIR absorbers with thermochromic materials or systems and/or acoustic or sound deadening character, when the bent glass that is mildly heat-strengthened, heat-strengthened, tempered, has a low thermal expansion coefficient, is specially edge treated and/or is chemically strengthened. This advantage is further extended when the laminate includes a hard coat low-e coating or stack of coatings on one or both of the exterior surfaces and when the two sheets of glass used to make the laminate are matched, to a large extent, in overall curvature or amount of bending or the radius curvature of the bent pairs of glass to be laminated together. Bending uncoated glass is different from bending low-e coated glass because heat is reflected from the low-e coated side and the heat is emitted differently. Thus, extra care must be taken to match the bending of an uncoated sheet of glass to the bending of a coated sheet of glass or coated sheets of glass, one of which has a low-e coating on what becomes the convex side and the other of which has a low-e coating on what becomes the concave side.

In order to make successful laminates, we have discovered that the sheets of glass must mate together reasonably well when the two sheets of glass are nested together. When the two pieces of glass are nested together and there should be no more than a 3 mm gap between any of the mating surfaces prior to lamination in order to dramatically improve the chances that the laminate will be stable with regard to delamination or bubble formation. Delamination and/or bubble formation are significant challenges for laminates wherein the interlayer includes NIR-absorbing materials and/or thermochromic materials and systems, as these laminates become warm when exposed to sunlight, especially on warm days.

The surface texture of the interlayer has also been found to be an important factor for good de-airing between the interlayer and the bent glass to minimize trapped air that could give rise to bubble formation when the laminate is warmed by sunlight. Preferred surface texture for the interlayer for bent glass laminates of the invention is provided by melt fracture or by embossing the interlayer with surface roughness of between about 5 microns to about 150 microns. More preferably it is between about 10 microns to about 80 microns. We have also found that the moisture content of the interlayer used in making these laminates is of significant concern when there are NIR-absorbing materials and/or thermochromic materials and systems present in the interlayer. Drying of the interlayer may be provided by method and constructions disclosed in U.S. Ser. No. 12/816,635 METHOD AND CONSTRUCTIONS FOR MOISTURE SENSITIVE LAYERS AND STRUCTURES HAVING REDUCED MOISTURE CONTENT IN MOISTURE SENSITIVE LAYERS, the entirety of which is hereby incorporated by reference herein. To avoid bubble formation in these laminates with an NIR-absorbing interlayer when the laminates are used as solar control windows, the interlayer should have a maximum water or moisture content between about 0.05% and about 1% by weight of water compared to the total weight of the interlayer.

Most plastic or polymer films or sheets, including those including CTB or CWO nanoparticles and combinations of nanoparticles with other NIR-absorbing materials are subject to some environmental degradation. Thus stabilization of plastic or polymer films or sheets including interlayers by preventing or minimizing degradation due to heat and/or light induced reactions of materials is desirable. The best approach to achieving stability is to use substances or materials that are inherently high in stability. Also effective is to provide barriers and seals against the ingress of substances or radiation that contribute to degradation, especially oxygen, water and/or ultraviolet light. Another important approach is to provide additives which minimize, or mitigate the impact of degradation processes via competitive light absorption, sequestering degradation products and/or inhibiting further degradation.

The plastic or polymer films or sheets which contain NIR-absorbing materials like CTB or CWO nanoparticles (or one or more other types of nanoparticles and/or other NIR absorbers) may also contain various stabilizers and additives. These additives include stabilizers such as UV absorbers, UV stabilizers, hindered amine light stabilizers, antioxidants, thermal stabilizers, adhesion promoting agents, and/or adhesion inhibiting agents, and the like. The UV absorbers and light stabilizers may include hydroxyphenylbenzotriazoles, hydroxyphenyltriazines, hydroxybenzophenones cyanoacrylates, and/or hindered amines. The plastic or polymer films or sheets may also contain plasticizers, coloring agents, color suppressing agents, and/or a variety of other additives known in the art of polymer films and interlayers. These additives are used in amounts in which they are effective. Typically this means about 0.1 to about 3.0 weight % for each additive.

Important stabilizers that may be added to the plastic or polymer films or sheets including interlayers are antioxidants and heat stabilizers. Preferred are free radical inhibitors such as the hindered phenols. Some useful antioxidants, thermal stabilizers, and anti-yellowing agents include 2,6-di-tert-butyl-4-methylphenol (BHT), Irganox® 245, Irganox® 1010, Irganox® 1035, Irganox® 1076, Irganox® 3114, Irganox® 5057, and Anox® IC-14, and a variety of hydroquinones like 2,5-di-t-butyl,1,4-hydroquinone. The Irganox® materials are available from BASF, and the Anox® material is available from Addivant of Danbury, CT. These stabilizers are typically added in amount of from 0.01% to 3% by weight of the interlayer.

Photodegradation, especially from short wavelength light (i.e., UV in the range of 280 to 400 nanometers and short wavelength visible light in the range of 400 to 500 nanometers) in the plastic or polymer films or sheets or due to short wavelength light absorption by the NIR-absorbing material, may be minimized or eliminated by adding short wavelength absorbing additives to the polymer of interest. These additives are sometime called "UV absorbers" and may be divided into two groups. The first group includes materials which simply absorb short wavelength light. Examples of this group are ethyl-2-cyano-3,3-diphenylacrylate and (2-ethylhexyl)-3,3-diphenylacrylate, available from BASF as Uvinul® 3035 and Uvinul® 3039, respectively. The second group involves absorbers of short wavelength light which also function as stabilizers against the propagation of degradation initiated by light exposure. Examples of materials of this group are hydroxybenzophenones, hydroxyphenylbenzotriazoles, and hydroxyphenyltriazines. Examples of these materials are sold under the trade names: Tinuvin® P, Tinuvin® 213, Tinuvin® 234, Tinuvin® 326, Tinuvin® 327, Tinuvin® 328, Tinuvin® 400, Tinuvin® 405, Tinuvin® 479, and Tinuvin® 1600. These materials are available from BASF. Also useful are nickel salt stabilizers such as dialkyldithiocarbamates which are good UV absorbers, though they may give a slight yellow hue to polymer films.

Also effective in helping to stabilize NIR-absorbing interlayer systems are light stabilizers that themselves are not very effective at absorbing short wavelength light. Preferred materials of this type are hindered amine light stabilizers (HALS). Useful HALS include Tinuvin® 144, Tinuvin® 123, Tinuvin® 765, and Tinuvin® 770, which are available from BASF.

Synergistic combinations of several types of light and thermal stabilizers are particularly effective in stabilizing interlayers with NIR-absorbing materials.

Any or all of the above stabilizers or combination of stabilizers may be added to any of the NIR-absorbing plastic or polymer films including any of the interlayers of the present invention. In addition, the plastic or polymer films or laminates comprising these interlayers may be edge sealed to prevent delamination and/or ingress of substances like water and oxygen. Eliminating or minimizing moisture and oxygen often helps to inhibit many of the thermal and photodegradation pathways or modes, thus improving thermal and photo stability of the interlayers.

When certain nanoparticles, such as CTB or CTO nanoparticles, are used as the NIR absorber, there may be some color appearance to the interlayer and/or the laminate which contains the interlayer. This color often gives the laminate a slight blue appearance. We have found that this color may be suppressed or made to appear closer to neutral by the addition of certain visible light absorbing agents directly to the interlayer, without adversely impacting the performance or durability of the interlayer. A preferred color neutralizing agent is Keyplast Red 2G, present in amounts between about 0.0005 and about 0.01 weight %.

Testing was conducted to evaluate color suppression of PVB interlayers including CTB nanoparticles. Five interlayer films were prepared by extrusion. The interlayers had the following compositions:

Sample 1: 0.09% CTB nanoparticles; 0.9% Tinuvin 1600; 0.1% Irganox 1010; 26.8% 3G0 and 72% PVB.

Sample 2: 0.125% CTB nanoparticles; 0.9% Tinuvin 1600 (UV absorber); 0.1% Irganox 1010; 26.75% 3G0 and 72% PVB.

Sample 3: 0.11% CTB nanoparticles; 0.9% Tinuvin 1600 (UV absorber); 0.2% Irganox 1010; 8.6% 3G0 and 90% PVB.

Sample 4: 0.11% CTB nanoparticles; 0.45% Tinuvin 405 (UV absorber); 0.25% Irganox 1010; 0.00100% Keyplast Red 2G, 26.05% 3G0 and 73% PVB.

Sample 5: 0.11% CTB nanoparticles; 0.45% Tinuvin 405 (UV absorber); 0.25% Irganox 1010; 0.00125% Keyplast Red 2G, 26.05% 3G0 and 73% PVB.

Accordingly, Samples 1-3 were comparative formulations without a color suppressing agent and Samples 4-5 were color suppressed. A laminate was made with each interlayer using two sheets of 3 millimeter thick, clear soda lime glass. The laminate sample numbers in Table 1, below, correlate to the interlayer formulations above.

TABLE 1

|  | thickness (microns) | a* | b* | c* | L* | |
| --- | --- | --- | --- | --- | --- | --- |
| Sample 1 | 745 | −5.6 | 2.5 | 6.1 | 89.0 | Comparative |
| Sample 2 | 768 | −7.0 | 1.9 | 7.3 | 87.4 | Comparative |
| Sample 3 | 455 | −5.5 | 2.1 | 5.9 | 88.7 | Comparative |
| Sample 4 | 649 | −2.0 | 3.7 | 4.2 | 88.6 | Suppressed |
| Sample 5 | 708 | −0.7 | 3.5 | 3.6 | 87.7 | Suppressed |

Color suppression was successful in reducing a* values and hence the c* value to give a more neutral color appearance to the laminate made with these interlayers.

A preferred method of preparing the NIR-absorbing plastic or polymer films including interlayers is by an extrusion cast method. A particularly preferred method of extrusion is a high shear process using a twin screw extruder to highly disperse and distribute the nanoparticle NIR absorber in the interlayer material and to provide layers with uniform light absorption properties and with uniform and minimal levels of haze. The twin screw extruder is preferably connected to a gear pump to provide uniform pressure to the extrusion die to help achieve uniform gauge to the resulting interlayer. A transverse direction variation in gauge of less than about ±5% of the average thickness and machine direction variation in gauge of less than about ±7% of the average thickness has been achieved with interlayer containing NIR-absorbing particles with the twin screw method. Although generally more expensive, highly controlled gauge and uniformity of absorbance may also be achieved with NIR-absorbing interlayers prepared by solvent casting. For less demanding applications, NIR-absorbing plastic or polymer films of the invention, including interlayers, may also be produced by extrusion with a single screw extruder.

It is preferred that interlayers comprising the NIR-absorbing materials have a surface texture to aid in de-airing between the glass and the interlayer during the lamination process. This texture may be provided by embossing or by melt fracture of the interlayer surface just prior to or as the layer exits the die of an extruder, or by a post-embossing process if the layer is produced by solvent cast. An interlayer may have a smooth side and texture on another side if it is to be bonded to other films, sheets, or interlayers in an encapsulation or pre-lamination process to make bi-layer, tri-layer, or multi-layer stacks. Interlayer texture or surface roughness ($R_z$) may be determined directly with a profilometer, such as a Pocket Surf PS1 from Mahr Federal Inc., Providence, R.I. The $R_z$ value for surface roughness of the interlayer surface to be adhered to the glass may be between about 5 microns to about 150 microns. More preferably it is between about 10 microns to about 80 microns.

A preferred interlayer for incorporating the NIR-absorbing materials is an acoustic or sound deadening interlayer. NIR-absorbing nanoparticles are readily dispersed in low molecular weight polymers or high molecular weight polymers such as PVB. Multilayer acoustic interlayers are prepared by combining stiffer or higher molecular weight with less stiff, lower molecular weight polymeric layers. These multilayer interlayers with NIR-absorbing materials in one or more than one of the layers of an acoustic interlayer are particularly efficient in dampening acoustic energy in the 80 hertz to 8,000 hertz frequency range. As used herein, an interlayer is an "acoustic interlayer" if the sound transmission of the laminate with the acoustic interlayer is decreased by at least 2 decibels as compared to a laminate with the same thickness and base polymer of a non-acoustic interlayer. This has particular advantage with windows for heavy equipment vehicles, which normally have monopane windows, as there is often a lot of heat load from the sun and a lot of noise. An interlayer with NIR-absorbing materials may be used in combination with glass that has a hard coat low-e coating on the interior surface of the window pane. This combination, in conjunction with the extra sound deadening character of an acoustic interlayer, provides an outstanding solution to both noise and heat load problems, simultaneously.

When the interlayer is made up of multiple layers, an advantageous condition is realized in which the NIR-absorbing materials are placed in one layer, and where another layer between the sun and the layer with NIR-absorbing materials contains UV absorbers which act as a barrier to prevent or minimize the amount of UV reaching the NIR-absorbing materials. If there is adequate UV absorption in the layer closer to the sun, this configuration prevents the UV from degrading the NIR-absorbing materials and/or prevents the UV that would otherwise be absorbed in the NIR-absorbing materials from facilitating the degradation of other components of the plastic or polymer films. The barrier may also protect other components of the other layers of the interlayer from potentially detrimental UV exposure.

U.S. Pat. Nos. 6,084,702 and 6,446,402, the entireties of which are hereby incorporated by reference herein, disclose the use of visible and/or NIR-absorbing materials as static and/or residual light energy absorbing materials combined with or associated with thermochromic, (TC), layers to enhance the sunlight responsiveness of the thermochromic layers. Patent publication WO 2008087077 A1, the entirety of which is hereby incorporated by reference herein, discloses the use of NIR-absorbing nanoparticles for enhancing the sunlight responsiveness of TC layers. Patent publication US 20130215490 A1, the entirety of which is hereby incorporated by reference herein, discloses light absorbing materials which generate heat when exposed to light and in which a temperature rise above a threshold temperature causes a phase transformation in TC materials like $VO_2$ nanoparticles. However, we have discovered an advantageous combination of NIR-absorbing nanoparticles and ligand exchange thermochromic (LETC) materials and systems. LETC materials, systems, devices and applications are described in detail in U.S. Pat. Nos. 7,525,717; 7,538,931; 7,542,196; 7,817,328; 8,018,639; 8,154,788; 8,182,718; 8,431,045 and 8,623,243. The entire contents of these patents are hereby incorporated by reference. U.S. Pat. Nos. 7,525,717; 7,538,931; 7,542,196; 8,018,639; 8,182,718; 8,431,045 disclose a system with sunlight responsiveness enhanced by a NIR absorber combined with a TC system as described in the following quote from these disclosures: "the nearly temperature independent absorbance of $CoI_4^{2-}$ is largely in the NIR and causes the system to warm on sunlight exposure. The sun exposure induced temperature rise causes an increase in the concentration of $NiI_4^{2-}$ and a decrease in visible light transmission. Any other thermochromic layer in contact with a layer containing this system would also increase in temperature and broad visible light attenuation is possible just from direct sunlight exposure."

The goal of combining NIR-absorbing materials with thermochromic materials for many window applications is to maximize visible light transmission of the window when there is little or no direct sunlight on the window, to minimize solar energy transmission when there is direct sunlight without losing too much desirable daylighting, and to do so with excellent durability throughout the lifetime of the window and with minimal haze in the window unit at all times. This invention takes the concept of combining NIR-absorbing materials with thermochromic materials and systems to a whole new level. We have discovered combinations in which the interlayer has an internal visible light transmission ($T_{vis}$) above 50% and a total solar transmission ($T_{sol}$) below 55% when the interlayer is at 15° C., and an internal $T_{vis}$ below 25% and a total $T_{sol}$ below 25% when the interlayer is at 75° C., while at same time the internal haze of the interlayer is below 3.5% all of the time.

The internal visible light transmission ($T_{vis}$) of the interlayer is calculated by measuring the light transmission spectrum of a laminate at the temperature of interest. The laminate for determining internal transmission of the interlayer may be made by placing the interlayer between two sheets of 3 millimeter thick, clear, soda-lime glass and applying heat and pressure until the surface texture of the interlayer is no longer observed. The wavelength range for the spectral measurements includes from about 380 to about 780 nm. The light transmission and reflectance of the glass used to make the laminate is also measured in the same wavelength range. These spectra are used to calculate the percentage of visible light transmitted or reflected according to National Fenestration Rating Council (NFRC) 300-2014. The $T_{vis}$ of the interlayer is defined as the result of the following calculation.

$$\text{Internal } Tvis = \frac{A}{B*C*D]}$$

where
A=$T_{vis}$ calculated for the laminate
B=$T_{vis}$ of the first glass layer+visible light reflectance of the first glass layer
C=$T_{vis}$ of the second glass layer+visible light reflectance of the second glass layer
D=1−the visible light reflectance of the laminate The visible light reflectance of the laminate is approximated as the value 0.0415+(laminate visible transmittance*0.0415). This calculation is a close approximation for the correction of the transmission losses due to the reflections from the air-glass interfaces of the laminate and the light absorbed by the glass itself and is used as defined herein to give a value for internal transmission. Thus, for a laminate composed of two pieces of 3 mm clear soda lime glass with a $T_{vis}$ for the laminate of 55.00% calculated from the measured spectral transmission, the application of the correction factor ((0.903+0.083)*(0.903+0.083)*(1−(0.0415+0.55*0.0415))=0.9097 which would yield an internal transmission of the interlayer of 60.46% (i.e. 55%/0.9097) where the transmission and reflectance values are typical values for clear glass from the International Glazing Database.

The internal solar energy transmission ($L_A$) of the interlayer is calculated by measuring the transmission spectrum of a laminate at the temperature of interest. The laminate for these spectral measurements may be made by placing the interlayer between two sheets of 3 millimeter thick, clear, soda-lime glass and applying heat and pressure until the surface texture of the interlayer is no longer observed. The wavelength range of the transmission spectrum includes the range from 300 to 2500 nm. The transmission and reflection spectra of the glass used to make the laminate are also measured in the same wavelength range. These spectra are then used to calculate the percentage of solar energy transmitted or reflected according to NFRC 300-2014 for the laminate and the sheets of glass. The internal $T_{sol}$ of the interlayer is defined as the result of the following calculation.

$$\text{Internal } Tsol = \frac{A}{B*C*D]}$$

where
A=$T_{sol}$ calculated for the laminate
B=$T_{sol}$ of the first glass layer+solar energy reflectance of the first glass layer
C=$T_{sol}$ of the second glass layer+solar energy reflectance of the second glass layer
D=1−the solar energy reflectance of the laminate This calculation is a close approximation for the correction of the transmission losses due to the reflections from the air-glass interfaces of the laminate and the light absorbed by the glass itself and is used as defined herein to give a value for internal solar transmission. Thus, for a laminate composed of two pieces of 3 mm clear soda lime glass and an interlayer with a calculated Tsol of 37.40%, the application of the correction factor ((0.854+0.077)*(0.854+0.077)*(1−(0.0385+0.374*0.0385))=0.8209 would yield an internal Tsol of the interlayer of 45.56% (i.e. 37.4%/0.8209)where the transmission and reflectance values are typical values for clear glass from the International Glazing Database.

Internal haze of the interlayer is calculated by measuring the haze of a laminate made as just described and subtracting 0.5 percentage points to compensate for other sources of haze in the laminate, such as the two glass layers. Thus a laminate with a measured haze of 4% would result in a 3.5% internal haze for the interlayer.

In some embodiments of the invention, laminates made with 3 millimeter thick, clear, soda lime glass with an interlayer including NIR-absorbing material and thermochromic material have a $T_{vis}$ above 50% and a $T_{sol}$ below 46% when the interlayer is at 25° C. In some embodiments, the disclosed laminates have a $T_{vis}$ above 45% and a $T_{sol}$ below 35% when the interlayer is at 25° C. In some embodiments, the disclosed laminates have a $T_{vis}$ below 25% and a $T_{sol}$ is below 20% when the interlayer is at 65° C., while at same time the internal haze of the interlayer is below 3.5% at all temperatures and transmissions.

We have discovered an oxygen insensitive thermochromic interlayer with NIR-absorbing materials which has a $T_{vis}$ above 45% and a $T_{sol}$ below 25% at 25° C., and a $T_{vis}$ below 25% and $T_{sol}$ below 20% at 65C.

An interlayer temperature of 15° C. is common when the ambient outdoor temperature is in the vicinity of 15° C. and there is little or no direct sunlight on the window that includes these interlayers. An interlayer temperature of 65° C. is often observed on days and at times when there is significant direct sunlight on a window including a thermochromic tinting interlayer, especially an interlayer that includes a NIR-absorbing material or a combination of NIR-absorbing materials. The window and interlayer get this hot in direct sun because much of the direct sunlight which would otherwise have been transmitted through the window is instead being absorbed by these highly efficient, dynamic interlayers, solar control laminates, and windows.

An unexpected challenge arises when attempting to minimize haze in a polymer matrix that includes thermochromic materials. The thermochromic materials and systems and associated additives present a unique matrix requiring specific surfactant(s), dispersant(s), and synergist(s) to achieve high NIR absorbance, minimal visible light absorbance, and also minimal light scattering or haze. Suitable surface treatments for particles are provided by amines and amide surface modifying agents such as alkyl-4-dimethylaminobenzoates and stearyl stearamide. Dispersants and synergists such as the hyperdispersants, for example Solsperse from Lubrizol of Wickliffe, Ohio, are useful for minimizing haze and optimizing desired high NIR absorbance and low visible light absorbance.

Of particular interest is U.S. Pat. No. 7,525,717 entitled "Multi-layer Ligand Exchange Thermochromic Systems," the entirety of which is hereby incorporated by reference herein, which discloses multilayer TC films and separators for multilayer TC systems. As used herein, the term "interlayer" may be a single film, sheet, or layer or alternately a series of two or more films, sheets, or layers including separator layers between various other layers. An advantage is realized when a UV-absorbing TC layer without NIR-absorbing materials is placed between the sun and a TC layer comprising NIR-absorbing materials. In addition to providing an exceptional barrier to UV light, as the TC layer without NIR-absorbing materials is warmed by sunlight, it tints and also blocks energetic visible light that would otherwise contribute to degradation processes in the NIR-absorbing materials and/or the layer containing them. This is particularly advantageous when the tinting of the TC layer(s) without NIR-absorbing materials results in absorbance of short wavelength visible light in the range of about 400 nm to 500 nm, as photons with these wavelengths are the most energetic wavelengths of visible light.

U.S. Pat. No. 7,525,717 also discloses the use of separators between TC layers in a multilayer system. A similar advantage is realized when the separator or a coating on the separator between two TC layers includes dispersed NIR-absorbing nanoparticles, dissolved NIR-absorbing materials, or combinations of dispersed particles and dissolved materials. An example of NIR absorbing materials coated on a layer that may be used as a separator is provided by Air Blue 80 available from Llumar. Here, the TC layer materials have no, or at most minimal, interaction with the NIR-absorbing nanoparticles and/or materials, and thus the NIR-absorbing nanoparticles and/or materials will not act by themselves or in concert with materials in the TC layers to cause degradation processes. Also, the absorption of NIR light in the separator is particularly effective in rapidly heating the TC layers with which the separator is in contact. A separator which is a good UV absorber provides an additional advantage, especially if the TC layer closer to the sun does not already provide this feature. Thus, a preferred separator for a multilayer TC system combines NIR absorption and UV absorption for enhanced stability and performance. Another previously unforeseen advantage is that using NIR-absorbing materials in the separator often provides enhanced separator or barrier characteristics. In the case where the NIR-absorbing materials are impermeable nanoparticles, the separator is even more effective in preventing materials from one TC layer from diffusing through the separator into another TC layer, and vice versa. The impermeable nanoparticles introduce a tortuous path for diffusion, and thus effectively increase the diffusion path length for materials that might otherwise diffuse more quickly through the separator and thereby decrease the useful life of the TC system. This is particularly of interest for multilayer TC systems used in energy saving windows, where the useful life might be 20 to 30 years.

While it is preferable to locate the NIR-absorbing materials in layers further from the sun (i.e., positioned such that UV and short wavelength visible light are effectively absorbed before reaching the layer(s) containing the NIR-absorbing materials to minimize degradation), remarkably, we have discovered that some TC layers which include NIR-absorbing materials that may be exposed to sunlight without a barrier for UV or short wavelength visible light and still exhibit acceptable durability. This discovery is illustrated in the durability results and discussion of FIG. 23.

The interlayers, films, or sheets of the invention are often used in laminates, but they may also be used as a retrofit product in the form of a sheet or film that to be adhered to an existing window pane. It is preferable, but not always necessary, that the glass of the window pane be strengthened, tempered, or heat treated to prevent breakage upon exposure to sunlight. The sheets or films may be directly adhered to glass or may be part of a multilayer film structure in which other films play a role as substrate for abrasion resistant hard coat layers, low emissivity layers, spall resistance, and/or structural shatter resistance. The NIR-absorbing materials may be contained in a sheet or film such as an acrylic, polycarbonate, or polyethylene terephthalate (PET) sheet or film, or the NIR-absorbing materials may be contained in an adhesive/interlayer that is used to bond sheets or films like an acrylic, polycarbonate, or PET sheets or films to an existing window pane. The adhesive/interlayer may also contain thermochromic materials. It has been discovered that a particularly effective solar control product may be provided by NIR-absorbing materials in a sheet or film or in an adhesive/interlayer for bonding the sheet or film to glass in combination with LETC materials and systems. In particular, LETC materials and systems that comprise nickel ions and bromide ions or cobalt ions in combination with bromide ions or ligands that coordinate to cobalt through oxygen are especially effective in this type of application. These LETC materials and systems have little or no oxygen sensitivity, and when combined with the NIR-absorbing materials disclosed herein, provide excellent solar control. This combination substantially blocks the NIR portion of the spectrum and provides variable visible light attenuation due to the thermochromic materials, especially due to the sunlight responsiveness of the combination of NIR absorbers and thermochromic materials. These TC materials and systems avoid the oxygen sensitivity of iodide-based thermochromic materials and systems. Thus, this combination may be used in applications where the layer(s) containing the thermochromic materials are not laminated between two sheets of glass. In general, glass provides a much better barrier to oxygen than plastic sheets or films, so oxygen sensitivity of the thermochromic material is less of a concern for glass-based laminate applications.

While certain nanoparticles are good absorbers of the NM light from the sun that reaches the earth surface, few are known which provide a sharp cutoff in the far red wavelengths of visible light and/or the infrared wavelengths nearest the visible region. The wavelength of particular interest are between 650 nm and 850 nm and particularly between 700 nm and 800 nm, We have discovered a class of remarkable absorbers, certain tetrahalometalates, that provide this sharp cutoff for the NIR region nearest to the visible. These tetrahalometalates not only absorb strongly in the nearest NIR region to visible, but also, in some cases, provide excellent UV absorbing properties. These tetrahalometalate sharp cutoff absorbers may also absorb some of the longest wavelengths of visible red light without a large impact on the total visible light transmission or the overall color of a film or set of films that include the absorbers. Even if there is a small amount of color, which in some cases might be objectionable, we have discovered. special color suppression systems that are effective in giving a gray or neutral color appearance even in these specific circumstances. Remarkably, it has been discovered that tetrahalometalate MR absorbers may be dissolved in some polymer materials, are thermally stable enough to be incorporated in the interlayers disclosed herein during the extrusion process, and exhibit good durability when exposed to sunlight, Tetrahalometalates useful herein may be metalates of a transition metal ion with ions of bromide, chloride, or iodine. Preferably, they are metalates of nickel or cobalt with bromide, chloride, or iodine. The tetrahalometalates of particular interest are tetrabromonickelate ($NiBr_4^{2-}$), tetrabromocobaltate ($CoBr_4^{2-}$), and tetraiodocobaltate ($CoI_4^{2-}$). These tetrahalometalates may be used in amounts of about 0.1 gram to 10 grams per square foot of interlayer.

We have discovered that obtaining an interlayer with a tetrahalonickelate or a tetrahalocobaltate as a NIR absorber with minimal visible light absorption requires coordination of a number of criteria at once. First, the salt of the tetrahalometalate must be largely soluble in the interlayer polymer at some useful concentration level, i.e., a concentration that is able to provide the desired NIR absorption. The choice of interlayer polymer and the cation associated with the tetrahalometalate are important considerations in this regard. Preferred interlayer materials are PVB, TPU, ionomers like poly(ethylene-co-methacrylic acid), and EVA. Of these, PVB is most preferred. For the cation, tetra-alkyl-ammonium, tetra-aryl-ammonium, tetra-aralkyl-ammonium, tetra-alkyl-phosphonium, tetra-aryl-phosphonium, tetra-aralkyl-phosphonium, and alkali metal cations are preferred. Of these, tetra-alkyl-ammonium cations are most preferred.

Second, the metal, nickel, and/or cobalt must be largely coordinated by four halide ions. Simply dissolving a salt like tetrabutylammonium tetrabromonickelate $(TBA)_2NiBr_4$ in a polymer or liquid solvent is not sufficient, as almost always, significant dissociation of halide ion from the metal ion is observed with these metal ions. When some of the halide ions are displaced, the spectrum of the metal complexes shifts to shorter wavelengths, which results in more visible light absorption. In order to shift the equilibrium so that most of the nickel and/or cobalt ions are largely surrounded by four halides, excess halide ion generally needs to be present. It is preferred that the ratio of halide ion to transition metal ion be greater than four, and more preferably greater than six.

Third, the combination must be chemically stable and especially photochemically stable with respect to sunlight exposure over long periods of time. We have discovered that the UV absorption of $NiBr_4^{2-}$, and tetraiodocobaltate or $CoI_4^{-2}$ can be especially effective in stabilizing interlayers with nanoparticles like CTB, CWO, or other tungstates or tungsten bronze particles. Particularly preferred interlayers contain $NiBr_4^{2-}$ or $CoI_4^{2-}$ in a layer with NIR-absorbing nanoparticles including CTB and/or CWO.

The tetrahalometalates of nickel and cobalt combine particularly well with multilayer alternating refractive index (MLARI) film, especially those know as Ultra Clear Solar Films (UCSF), available from 3M of St. Paul, Minn. The UCSF films reflect NIR at longer wavelengths, but transmit essentially all of the wavelengths typically absorbed by tetrahalometalates of nickel and cobalt. The combinations disclosed herein allow the blockage of more of the NIR energy of the sun than is possible with either the UCSF or the tetrahalometalates alone. See FIGS. 15 and 16 for examples of this combination. A particularly advantageous combination is realized when the adhesive that bonds the MLARI film to a sheet of glass includes tetrahalometalates, and when the opposite side of the MLARI film has a low emissivity coating or series of coating. This combination allows the absorption of the NIR wavelengths that are generally transmitted by the MLARI to be absorbed by the tetrahalometalates, allows the MLARI film to reflect other wavelengths of NIR light, and allows the low emissivity coating(s) to minimize the amount of the absorbed energy that is radiated to the interior of a building or vehicle. This embodiment of the invention is illustrated in FIG. 26E, where the plastic sheet 90 is a MLARI or UCSF film. The use of tetrahalometalates in combination with a MLARI or UCSF film is also in interest when combined with LETC materials and systems. The use of LETC materials and systems in combination with MLARI and UCSF films in described in detail in pending application U.S. Ser. No. 13/771,285 the entire contents of which are incorporated by reference herein.

All of the NIR-absorbing nanoparticles, soluble NIR-absorbing materials and/or NIR-absorbing tetrahalometalates and combinations thereof may be advantageously combined with acoustic PVB. U.S. Pat. No. 7,968,186 discloses "Glass laminates comprising acoustic interlayers and solar control films," the entirety of which is hereby incorporated by reference herein. Acoustic PVB often consists of a layer of soft or less stiff PVB, which optionally includes lower in molecular weight and/or higher plasticizer content PVB sandwiched between two layers of stiff PVB which optionally comprise higher in molecular weight and/or lower plasticizer PVB. The PVB layers may be separated from each other by the separator such as those described in U.S. Pat. No. 7,525,717 entitled "Multi-layer Ligand Exchange Thermochromic Systems" or particularly advantageously by a UCSF film. UCSF films provide excellent separator properties based on their multilayer nature and provide selective NIR reflection which makes UCSF films particularly well suited for use in NIR attenuating acoustic interlayers where there are varying amounts of plasticizer present in the PVB layers. The UCSF separator keeps the plasticizer from diffusing or migrating from a low plasticizer layer to a high plasticizer layer. Sound traveling through a laminate with layers of alternating stiffness provides enhanced sound reduction or attenuation. The NIR-absorbing PVBs of the present invention are added to stiff and/or soft PVB layers and they are stacked together for acoustic interlayer applications with or without separator(s). Even PVB with no plasticizer or very low plasticizer with or without NIR-absorbing nanoparticles and/or tetrahalometalates may be used as one or more of the stiff layers of the acoustic PVB and provide a stiffness and sound reduction capability not previously realized in acoustic PVBs.

A combination of nanoparticles and tetrahalometalates NIR absorbers allows one to achieve a very high ratio of visible light transmission, $T_{vis}$ to solar energy transmission, $T_{sol}$. A high ratio defined by $T_{vis}$ divided by $T_{sol}$ is desirable in many window applications where there is a desire for good visibility by an occupant looking through the window and at the same time there is a desire to minimize the heat load from the sun that is experienced by the occupant through the window. Thus, the $T_{vis}$ involved is based on human eye sensitivity to the visible wavelengths and the $T_{sol}$ is the total solar energy transmitted of all the wavelengths of solar radiation reaching the earth's surface.

It is preferred that the $T_{vis}$ be determined by using the measured visible spectrum to calculate the percentage via NFRC 300-2014. Standard Weather-ometer® exposure is exposure at in an Atlas Electric Weather-ometer® at a black panel temperature of 85° C. and an irradiance of 0.55 watts/square meter at 340 nm.

The inventions are described and further illustrated by the figures and structures and discussion below. All $T_{vis}$ and $T_{sol}$ calculations reported below were performed using the method outlined in NFRC 300-2014. Haze measurements were made with a Shimadzu UV3101 with a standard integrating sphere attachment.

Referring now to the figures, FIG. 1 shows portions of the UV/Vis/NIR spectra for two laminates of a PVB interlayer. The solid line represents the spectrum of a laminate about 760 microns thick with an interlayer that does not contain CTB nanoparticles. The interlayer is laminated between two pieces of 3 millimeter thick soda lime glass and has $T_{vis}$=85% and $T_{sol}$=66%. The dashed line represents a laminate of a PVB interlayer about 400 microns thick which contains CTB nanoparticles at 0.055 weight %. This interlayer was laminated between two pieces of 3 millimeter thick heat-strengthened glass and has $T_{vis}$=76% and $T_{sol}$=47%. The decrease in NIR transmission due to the CTB nanoparticle is readily apparent, and the decrease in $T_{sol}$ is more significant than the decrease in $T_{vis}$.

Figure 2:
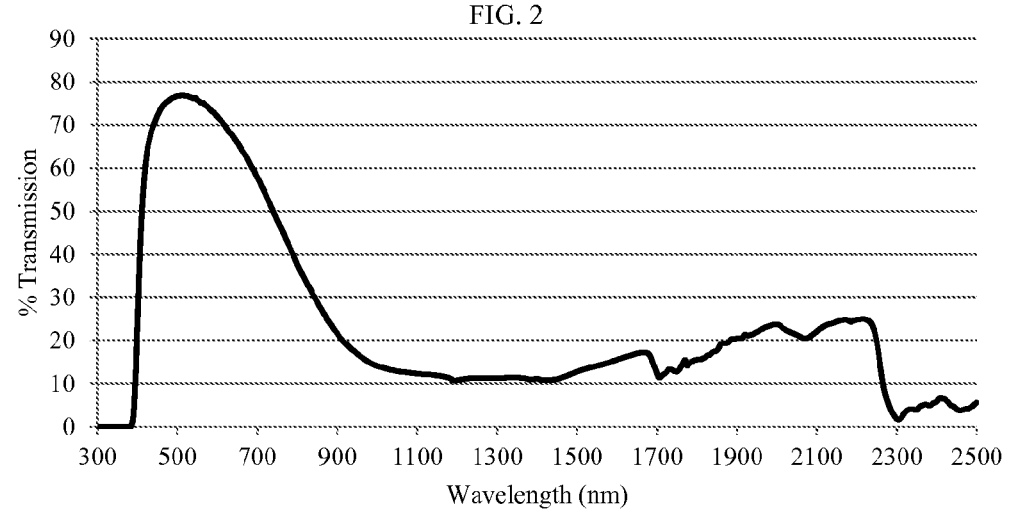
FIG. 2 shows the spectrum for a laminate in accordance with the invention made with an interlayer comprising PVB, a plasticizer, a stabilizer, a UV absorber and NIR-absorbing CTB nanoparticles.
Figure 5:
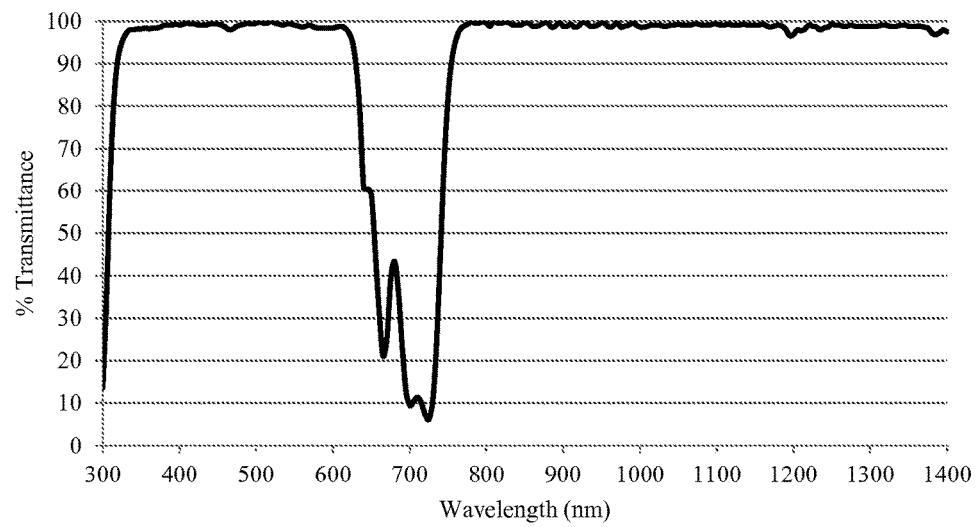
FIG. 5 shows the spectrum for a solution of 0.001M $CoBr_2$ and 0.1M LiBr in gamma-butyrolactone in a cuvette with a 1 cm path length versus a reference cuvette of pure gamma-butyrolactone.
Figure 6:
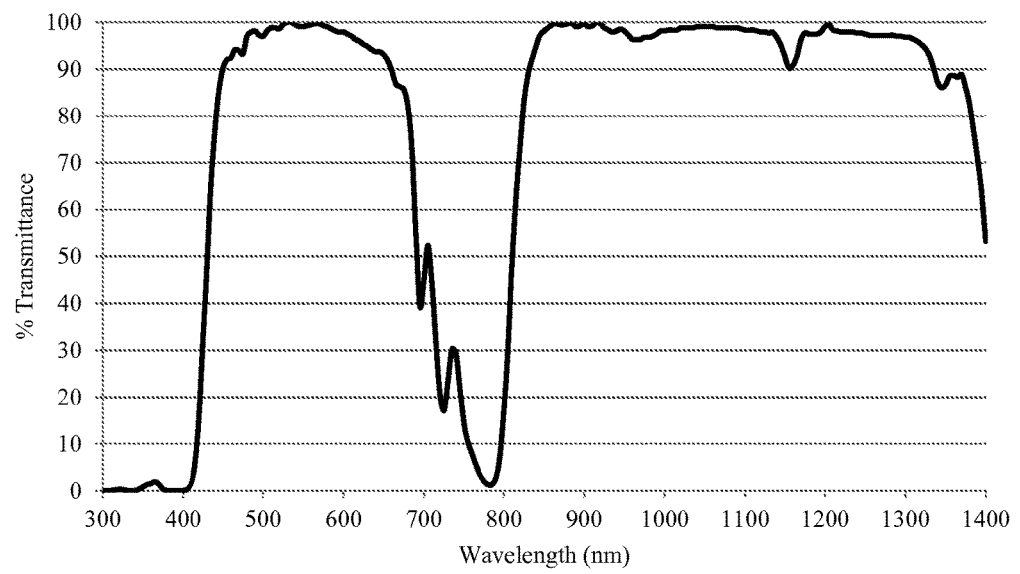
FIG. 6 shows the spectrum for a solution of 0.001M $Co(BF_4)_2\text{-}6H_2O$ and 0.2M NaI, in gamma-butyrolactone in a cuvette with a 1 cm path length versus a reference cuvette of pure gamma-butyrolactone.

FIG. 2 shows portions of the UV/Vis/NIR spectra for a laminate made with an interlayer about 745 micron thick including PVB, 26.8 wt % tri(ethylene glycol)bis(2-ethylhexanoate) as a plasticizer, 0.9 wt % Tinuvin® 1600 as a UV absorber, 0.1 wt % Irganox® 1010 as an antioxidant and thermal stabilizer, and 0.09 wt % CTB NIR nanoparticle from Nanophase. The interlayer is laminated between pieces of 3 millimeter thick clear soda lime glass. The laminate shows an excellent ratio of high visible light transmission, $T_{vis}$=74%, to low solar transmission, $T_{sol}$=41%, the haze was 1.23%. The laminate had excellent UV blocking behavior due to the presence of Tinuvin® 1600.

FIG. 3 shows that good NIR attenuation and solar control can be achieved with laminates made with dispersed CTB nanoparticles in a variety of interlayer resin materials, including the ionomer sold as Surlyn® 9150 (dotted line), a TPU (dashed line), and PVB (solid line). The nanoparticles were introduced into the resin materials by liquid injecting of a dispersion of the CTB in tri(ethylene glycol) bis(2-ethylhexanoate) into the resin stream in a twin screw extruder.

FIGS. 4-6 show spectra which demonstrate the close to the visible NIR absorption spectra that may be achieved with tetrahalometalates in liquid solution. FIG. 4 is the spectrum of a solution of of 0.005M (tetra(n-butyl)ammonium)$_2$NiBr$_4$ and 0.18M (tetra(n-butyl)ammonium)Br, FIG. 5 is the spectrum of a solution of 0.001M $CoBr_2$ and 0.1M LiBr, and FIG. 6 is the spectrum of a solution of 0.001M $Co(BF_4)_2$-$6H_2O$ and 0.2M NaL While the spectra are shown for liquid solutions, we have shown that this type of NIR absorption may also be provided in interlayers, especially those comprising PVB as a major constituent.

FIG. 7 shows the spectra of FIGS. 5 and 6 added together as if each of the NIR-absorbing systems were used as two separate NIR layers in a single system. As can be seen from FIG. 7, more of the NIR can be absorbed by a combination of layers, one of which comprises $CoBr_4^{2-}$ and another which comprises $CoI_4^{2-}$. While it is believed that most of the cobalt ions in these solutions were in the form of the tetrahalometalate, at least a small portion of the cobalt ions may have been in the form of trihalometalate or similar complexes. We have discovered that spectra nearly the same as those obtained in liquid solutions may be obtained in polymer film or layer by the proper choice of polymer and plasticizers. The type of spectrum shown in FIG. 7 is achievable by separate layers with cobalt and bromide in one layer and cobalt and iodide in another layer. Somewhat similar spectra may be achieved by the judicious choice of the concentrations of the ions of cobalt, bromide, and iodide, as illustrated in FIGS. 11 and 12.

FIG. 8 shows the transmission spectrum for a laminate with an interlayer including tetrabromonickelate as a dissolved NIR absorber. This is an illustration of the how the NIR absorption of the liquid solution of FIG. 4 may be realized in a solid interlayer useful for lamination of glass and other substrates. In order to have a high percentage of the nickel ions present as tetrabromonickelate, a large excess of bromide ions to nickel ions is preferred. In this case, the ratio of bromide ions to Ni(II) is about 12 to 1, and spectra show the nickel conforming largely to the spectra of tetrabromonickelate.

FIG. 9 shows the UV/Vis/NIR spectrum for a laminate made with a three-layer interlayer including a PVB layer with dissolved tetrabromonickelate similar to that disclosed in the FIG. 8, a layer of PET as a separator between the PVB layers, and a layer of PVB including NIR-absorbing nanoparticles. The laminate may be oriented so that PVB layer with dissolved tetrabromonickelate is toward the sun such that this layer will provide a UV barrier for the PET layer and the layer of PVB with the NIR-absorbing nanoparticles. Alternately, the layer of PVB including NIR-absorbing nanoparticles may also include UV absorbers, and may be oriented toward the sun. In this case, the layer will then provide a UV barrier for the PET layer and the PVB layer with dissolved tetrabromonickelate. In either case, two of the layers will be protected from potentially harmful UV radiation.

FIG. 10 shows portions of the UV/Vis/NIR spectrum for a laminate with an interlayer including a combination of Tinuvin® 405, CTB nanoparticles, and NIR absorbers including $NiBr_4^{2-}$, in a single layer of PVB. This interlayer has remarkably high $T_{vis}$ given the exceptionally low value for $T_{sol}$. Both the UV and NIR are blocked to a very large extent. The calculated value from the spectrum in FIG. 10 is $T_{vis}$=51% and $T_{sol}$=18%, yielding a ratio of 2.8 to 1.

FIG. 11 shows a transmission spectrum for a laminate with an interlayer including both tetrabromocobaltate and tetraiodocobaltate in a single PVB layer. The ratio of iodide ion to bromide ion to Co(II) is about 16.7 to 2 to 1.

FIG. 12 shows the spectrum for a MR-absorbing laminate with an interlayer including dispersed MR-absorbing nanoparticles, combined with the NIR-absorbing character of dissolved tetrabromocobaltate and tetraiodocobaltate, in a single layer of PVB. This interlayer can function as an interlayer for laminating sheets of glass and/or sheets of plastic together. As made, the laminate had $T_{vis}$=73% and $T_{sol}$=39%. This laminate was subjected to standard Weather-ometer® exposure, and after 6150 hours of exposure, the laminate had $T_{vis}$=68%, $T_{sol}$=36% and haze=1.14%.

FIG. 13 shows that MR-absorbing of dispersed NIR-absorbing nanoparticles may be combined with the MR-absorbing character of dissolved Lumogen 765, dissolved Lumogen 788, or dissolved Epolight 5810 in a layer of PVB which is still functional as an interlayer for laminating sheets of glass and sheets of plastic together. For Lumogen 765, $T_{vis}$ is 30% and $T_{sol}$ is 11%. For Lumogen 788, $T_{vis}$ is 45% and $T_{sol}$ is 16%. For Epolight 5810, $T_{vis}$ is 34% and $T_{sol}$ is 10%.

FIG. 14 shows that NIR-absorption capabilities of dispersed NIR-absorbing nanoparticles may be combined with the NIR-absorbing character of dissolved Yamamoto D13-016 or dissolved Yamamoto D13-037 in a layer of PVB which is still functional as an interlayer for laminating sheets of glass and sheets of plastic together, For Yamamoto D13-016, $T_{vis}$ is 73% and $T_{sol}$ is 34%. For Yamamoto D13-037, $T_{vis}$ is 72% and $T_{sol}$ is 35%.

FIG. 15 shows that layers of PVB including tetrabromonickelate may be combined with a MLARI film, such as a layer UCSF, and still function as an interlayer for laminating sheets of glass and sheets of plastic together.

FIG. 16 shows that layers of PVB including tetrabromocobaltate and tetraiodocobaltate may be combined with a MLARI film, such as a layer UCSF, and still function as an interlayer for laminating sheets of glass and sheets of plastic together.

FIG. 17 shows the increased sunlight responsiveness of a laminate with a thermochromic interlayer of the invention with MR-absorbing materials added to the interlayer (solid line), as compared to a laminate with a thermochromic interlayer without NIR-absorbing materials (control sample, dashed line). This FIG. shows the increased rate of the temperature increase and the higher temperature reached for the laminate with NIR-absorbing material when it is exposed to heating by light converted to heat, This is a significant characteristic, especially for monopane and motor vehicle window units which typically do not have the thermal insulation provided by being insulated into a double pane or insulated glass unit.

FIG. 17 thus indicates how the NIR-absorbing nanoparticles enhance the sunlight responsiveness of thermochromic layers. The control sample (dashed line) is composed of a commercial thermochromic Suntuitive® interlayer, available from Pleotint, LLC of Jenison, Mich., laminated between two pieces of 3 millimeter soda lime glass. The commercial Suntuitive® interlayer includes an approximately 350 micron thick layer that darkens to orange, and an approximately 765 micron thick layer that darkens to blue. The layer that darkens to orange is a good UV absorber, and the interlayer is oriented with the darkening to orange layer facing the sun or lamp so that it provides UV barrier protection for the layer that darkens to blue. The thermochromic interlayer with NIR character (solid line) includes a layer which darkens to orange, a PET separator, and a 765 micron thick layer that darkens to blue and which includes 0.06 weight % CTB nanoparticles in addition to its typical components. This thermochromic, NIR-absorbing interlayer was also laminated between two pieces of 3 millimeter thick, clear, soda lime glass. The laminates were equipped with thermocouples adhered to the side of the glass opposite the light source and placed side-by-side at 40 centimeters from a 700 watt halogen lamp. Glass temperatures were recorded every second for 67 minutes. The best-fit lines were calculated with data from the first 920 sec of the experiment. The best fit line for the temperature versus time for the laminate without NIR-absorbing nanoparticles was y=0.0273x+24.506, and the best fit line for the temperature versus time for the laminate with NIR-absorbing nanoparticles was y=0.0399x+24.023.

FIG. 18 shows the spectra for a laminate with an interlayer including thermochromic systems present like those used in commercial thermochromic windows, which have been modified by the addition of NIR-absorbing nanoparticle to one of the thermochromic layers. The thermochromic layers absorb progressively more and more visible light, plus a small amount of NIR, as the interlayer temperature increases, and the NIR-absorbing material gives strong, constant absorbance of NIR. This type of laminate shows the enhanced responsiveness to sunlight and/or heat lamp exposure, as illustrated in FIG. 17. When a laminate with this type of interlayer was placed in a window with a hard coat low-e coating on the inside-most surface of the laminate (i.e., the surface furthest from the sun or heat lamp), the tinting of the laminate significantly exceeded that of a laminate having an interlayer without the NIR-absorbing materials. In fact, the tinting of the laminate with the interlayer with NIR-absorbing materials and a hard coat low-e approached the tinting level and rate of a double pane window with a laminate with a thermochromic interlayer without NIR-absorbing materials. The spectra for the laminate in FIG. 18 were used to calculate the following values in Table 2:

TABLE 2

|  | 5° C. | 15° C. | 25° C. | 45° C. | 65° C. | 85° C. |
|---|---|---|---|---|---|---|
| $T_{vis}$ | 65% | 63% | 57% | 32% | 10% | 2% |
| $T_{sol}$ | 41% | 40% | 37% | 27% | 15% | 10% |

By the procedure given herein, the internal values for the laminate were calculated to be as shown below in Table 3:

TABLE 3

|  | 5° C. | 15° C. | 25° C. | 45° C. | 65° C. | 85° C. |
|---|---|---|---|---|---|---|
| $T_{vis}$ | 70% | 68% | 61% | 34% | 10% | 2% |
| $T_{sol}$ | 46% | 45% | 42% | 30% | 17% | 11% |

FIG. 19 shows the spectra for a laminate at various temperatures where the interlayer includes PVB with an oxygen insensitive LETC system which is based on nickel ions and bromide ions and is combined with the relatively stable NIR absorber known as Yamamoto D13-037. The thermochromic system shows some decrease in transmission with temperature in the NIR region, and significant decreases in transmission with increasing temperature in the longer wavelength region of the visible. The values calculated from the spectra are: at 25° C., $T_{vis}$ 58% and $T_{sol}$ 50%; at 45° C., $T_{vis}$ 37% and $T_{sol}$ 42%; at 65° C., $T_{vis}$ 23% and $T_{sol}$ 34%; at 85° C., $T_{vis}$ 16% and $T_{sol}$ 30%. The haze was 0.28%.

FIG. 20 shows the spectra for a laminate at various temperatures wherein the interlayer comprises PVB with an oxygen insensitive LETC system which is based on nickel ions and bromide ions in combination with the relatively stable NIR absorber known as Yamamoto D13-037 and NIR-absorbing nanoparticles. The thermochromic system shows significant decreases in transmission with increasing temperature in the longer wavelength region of the visible. This single layer interlayer provides good visible light transmission and blocks much of the rest of the solar spectrum when it is cool, and blocks significant amount of the visible and much of the rest of the solar spectrum when the interlayer is at higher temperatures such as those that it would experience when exposed to direct sunlight. The values calculated from the spectra are: at 25° C., 48% and $T_{sol}$ 22%; at 45° C., $T_{vis}$ 34% and $T_{sol}$ 18%; at 65° C., $T_{vis}$ 21% and $T_{sol}$ 14%; at 85° C., 13% and $T_{sol}$ 10%. The haze was 1.08%.

FIG. 21 shows the spectrum for a laminate that is an example of incorporating NIR-absorbing materials into an acoustic PVB interlayer to yield a solar control, sound deadening interlayer suitable for use in a laminate. The laminate associated with the depicted spectrum includes a first layer of PVB about 750 micron thick with approximate molecular weight of $M_w$=100,000 with a dissolved UV absorber, thermal stabilizer, and plasticizer, a second PVB layer about 500 micron thick with an approximate molecular weight of $M_w$=33,000 with dissolved thermal stabilizer, plasticizer, and 0.2 weight % CTB NIR-absorbing nanoparticles, and a third layer of PVB about 750 micron thick with an approximate molecular weight of $M_w$=100,000 with dissolved UV absorber, thermal stabilizer, and plasticizer. The values calculated from the spectra are $T_{vis}$ 72% and $T_{sol}$ 40%. After 2100 hours of standard Weather-ometer® exposure, the $T_{vis}$ was 74% and the $T_{sol}$ was 43%. Laminates of this type are particularly advantageous as windows for heavy equipment where heat and noise are major challenges for the equipment operators.

FIG. 22 shows the durability of a laminate with an interlayer which includes PVB with a combination of dispersed CTB nanoparticles and a dissolved LETC system which darkens to dark blue and contains nickel ions and bromide ions as key components. Standard Weather-ometer® exposure was used and the test laminate was place behind a UV barrier. Under these conditions, the laminate and the interlayer showed good stability with regard to $T_{vis}$ and range of thermochromic activity for more than 8,000 hours.

FIG. 23 shows the durability of a laminate with an interlayer which includes a PVB layer with a combination of dispersed CTB nanoparticles and a dissolved LETC system which darkens to dark orange and contains and nickel ions and iodide ions as key components. Standard Weather-ometer® exposure was used without a UV barrier in front of the laminate. Under these conditions the laminate and the interlayer show good stability with regard to $T_{vis}$ and range of thermochromic activity for more than 2,000 hours.

FIG. 24 shows the durability of a laminate with a three layer interlayer which includes a first layer including PVB with a dissolved LETC system which darkens to dark orange and contains and nickel ions and iodide ions as key components, a PET second layer as a separator, and a third layer which includes PVB with a combination of dispersed CTB nanoparticles and a dissolved LETC system which darkens to dark blue and contains nickel ions and bromide ions as key components. Standard Weather-ometer® exposure was used without a UV barrier in front of the laminate. Under these conditions the laminate and the interlayer show good stability with regard to $T_{vis}$ and range of thermochromic activity for more than 2,000 hours.

| Key to Figs. 25A-25D and 26A-26E | |
|---|---|
| 10 | sheet of glass or plastic |
| 20 | gas space |
| 30 | interlayer of the present invention |
| 40 | edge seal |
| 50 | spacer for gas space |
| 60 | low emissivity coating |
| 70 | laminate of the present invention |
| 80 | hard coat low emissivity coating |
| 90 | antireflective layer or self-cleaning layer or combination thereof |
| 95 | flexible plastic sheet or film |
| 100 | polymer layer 1 |
| 200 | polymer layer 2 |
| 300 | polymer layer 3 |
| 400 | polymer layer 4 |

FIGS. 25A through 25D show schematic cross-sectional views (not to scale) of various embodiments of the invention. FIG. 25A shows a cross-sectional view of an interlayer of the invention. Layer 100 is a single polymer layer which includes one or more than one NIR-absorbing material or substance and optionally includes thermochromic materials or systems.

FIG. 25B shows a cross-sectional view of an interlayer of the invention. Layer 100 is a polymer layer which includes one or more than one NIR-absorbing material or substance and optionally includes thermochromic materials or systems. Layer 200 is a polymer layer which acts as a UV barrier and/or acts in concert with layer 100 to form an acoustic interlayer.

FIG. 25C shows a cross-sectional view of an interlayer of the invention similar to that of FIG. 25B, but with layers 200 on either side of the layer 100. The layers 200 may be of the same or different construction.

FIG. 25D shows a cross-sectional view of an interlayer of the invention. Layer 100 is a polymer layer which includes one or more than one NIR-absorbing materials or substances and optionally includes thermochromic materials or systems. Layer 300 is a polymer layer which includes one or more than one of the following: 1) a NIR-absorbing material or substance; 2) thermochromic materials or systems; 3) UV absorbers and/or 4) a color suppressing agent. Layer 400 is a polymer layer that act as a separator or barrier for the materials and substances in layers 100 and 300 and is optionally a multilayer film that reflects NIR light. Optionally, the layers 100, 300, and 400 act together as an acoustic interlayer.

Figure 26A:
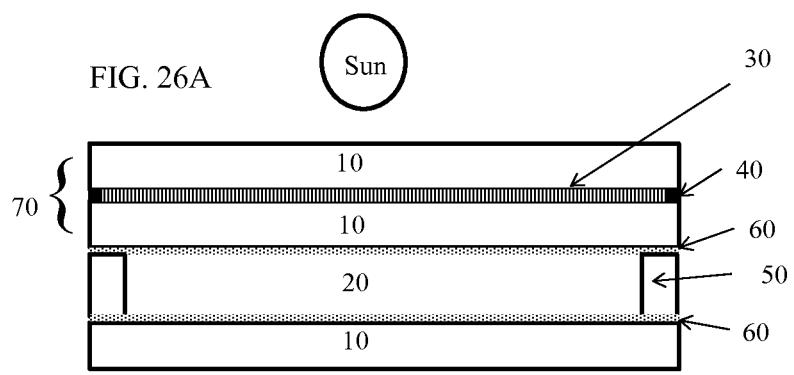
FIG. 26A shows a structure and configuration for an interlayer and laminate in accordance with the invention, as oriented for use with respect to the sun or other source of electromagnetic radiation.
Figure 26B:
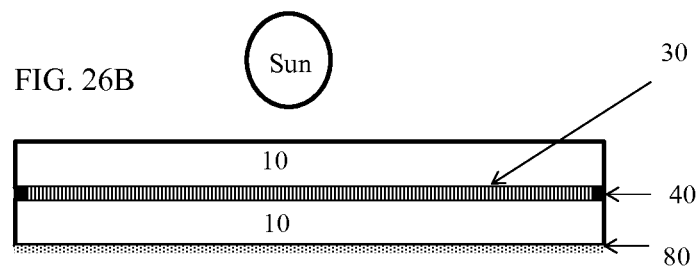
FIG. 26B shows a structure and configuration for an interlayer and laminate in accordance with the invention, as oriented for use with respect to the sun or other source of electromagnetic radiation.
Figure 26C:
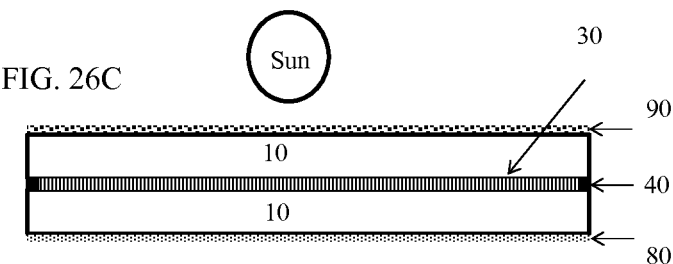
FIG. 26C shows a structure and configuration for an interlayer and laminate in accordance with the invention, as oriented for use with respect to the sun or other source of electromagnetic radiation.
Figure 26D:
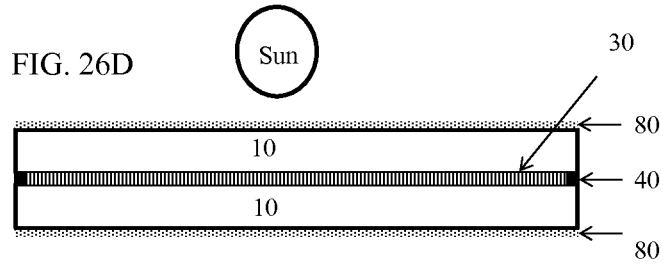
FIG. 26D shows a structure and configuration for an interlayer and laminate in accordance with the invention, as oriented for use with respect to the sun or other source of electromagnetic radiation.
Figure 26E:
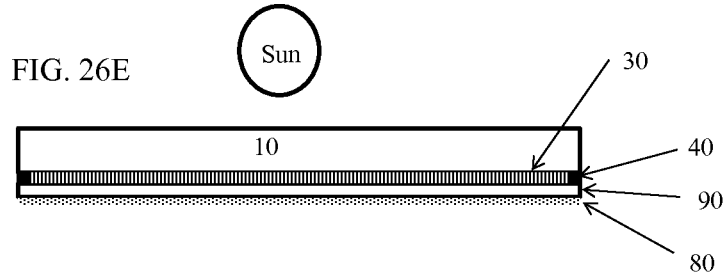
FIG. 26E shows a structure and configuration for an interlayer and laminate in accordance with the invention, as oriented for use with respect to the sun or other source of electromagnetic radiation.

FIGS. 26A through 26E show schematic cross-sectional views (not to scale) of various embodiments of the invention, with reference to a preferred orientation relative to the sun or other source of electromagnetic radiation. FIG. 26A shows a cross-sectional view of a double pane window with a laminate 70 of two sheets 10 of glass or plastic with an interlayer 30 (in accordance with the present invention) and optional edge seal 40 as one pane of the window. The second pane of the window is a third sheet 10 of glass or plastic, spaced away from the laminate 70 by a spacer 50 to define space 20, a gas space filled with air, argon, krypton or any low thermal conductivity gas. The window may further include an optional low emissivity coating 60.

FIG. 26B shows a cross-sectional view of a monopane window including a laminate of two sheets 10 of glass or plastic with an interlayer 30 in accordance with the present invention and optional edge seal 40 as one pane of the window. The depicted embodiment also includes an optional hard coat low emissivity coating 80 on the side farther from the sun.

FIG. 26C shows the same construct as that of FIG. 26B, further including an antireflective layer or a self-cleaning layer or a combination thereof 90 on the side closest to the sun.

FIG. 26D shows a remarkable situation in which a hard coat low-e coating 80 is provided on both the exterior side (closest to the sun) and the interior side of a laminated monopane window. The interlayer 30 may be any thermochromic interlayer disclosed herein. When the interlayer 30 is exposed to sunlight, the heating of the interlayer 30 is particularly effective the heat loss from both sides of the laminate is reduced by the low-e coating 80. Thus, the monopane tints to a greater extent than it would without both low-e layers 80 due to the conserved heat, and it blocks sunlight from directly penetrating into a building or vehicle in which the window is installed. However, it is preferable that the low-e coating 80 closer to the sun be higher in emissivity than the low-e coating 80 further from the sun. In this case there is some greater rejection of the absorbed sunlight energy to the outside (toward the sun side) as compared to the inside.

FIG. 26E shows a cross-sectional view of a monopane window including a laminate of one sheet 10 of glass or plastic and one sheet of a flexible plastic sheet or film 95, with an interlayer 30 in accordance with the present invention there between, and with an optional edge seal 40. The depicted embodiment also includes an optional hard coat low emissivity coating 80 on the side farther from the sun.

According to http://efficientwindows.org/shge.php the Solar Heat Gain Coefficient, (SHGC), is defined as "the fraction of incident solar radiation admitted through a window, both directly transmitted and absorbed and subsequently released inward. SHGC is expressed as a number between 0 and 1. The lower a window's solar heat gain coefficient, the less solar heat it transmits." Table 4 below shows the $T_{vis}$, $T_{sol}$ and SHGC for some comparison laminates and some laminates of the invention which include some of the interlayers of the invention. In each case the glass used in the laminates may be strengthened by any means, have low thermal expansion and/or be edged treated.

TABLE 4

| Monopane Laminate Composition | $T_{vis}$ | $T_{sol}$ | SHGC |
|---|---|---|---|
| 3 mm Clear Glass/PVB/3 mm Clear Glass | 88% | 72% | 0.79 |
| 3 mm Clear Glass/NIR PVB/3 mm Clear Glass | 76% | 37% | 0.55 |
| 3 mm Clear Glass/NIR PVB/3 mm Clear with Hard Coat Low-e | 73% | 35% | 0.47 |
| 3 mm Clear Glass/TC with NIR Nanoparticles/3 mm Clear Glass with Hard Coat Low-e | 62% to 9% | 36% to 13% | 0.48 to 0.30 |
| 3 mm Gray Glass/TC with NIR Nanoparticles/3 mm Clear Glass with Hard Coat Low-e | 52% to 8% | 30% to 10% | 0.43 to 0.28 |
| 3 mm Clear Glass/TC with Combination of NIR Absorbers/3 mm Clear Glass with Hard Coat Low-e | 55% to 8% | 23% to 7% | 0.38 to 0.26 |

Interlayer "NIR PVB" is interlayer with a transmission spectrum similar to FIG. 2. Interlayer designated as "TC with NIR Nanoparticles" is an interlayer with transmission spectra similar to FIG. 18. Interlayer designated as "TC with Combination of NIR Absorbers" is an interlayer that includes a PVB layer with tetrabromonickelate as a dissolved NIR absorber with a transmission spectrum similar that of FIG. 8, a PET separator, a thermochromic layer which darkens to dark orange as its temperature increases, a PET separator, a thermochromic layer which includes NIR absorbing CTB nanoparticles and darkens to dark blue as its temperature increases. Transmission values in Table 4 for the variable transmission monopanes are reported for laminates and interlayers at 5° C. and at 65° C.

The following procedure was used to obtain the optical properties for these glazing configurations. UV/Vis/NIR spectral data for a laminate was recorded using a Shimadzu UV3101. The data were imported into Optics 5.1, available from Lawrence Berkeley National Laboratory of Berkeley, Calif., (LBNL). The Optics 5.1 package was used to extract the spectral data for the interlayer and calculate spectral data for the laminate configurations listed in Table 4 using the procedures outlined in the Therm 6.3/Window 6.3 NFRC Simulation Manual (July 2013) from LBNL. The spectral data for these laminates were imported into LBNL's Window 6.3.74, which was used to calculate the values provided in Table 4.

The SHGC of monopane laminates which include combinations of thermochromic systems and NIR absorbing materials or substances reported in Table 4 start low and go even lower when the thermochromic interlayer is heated by, for example, exposure to direct sunlight. The sunlight responsiveness the thermochromic interlayer has also been dramatically enhanced so they darken faster and darken more when exposed to sun than laminates without the NIR absorbers. These are remarkably low SHGC values for monopane window units exhibiting dynamic tinting. The dynamic tinting allows for high $T_{vis}$ values in the absence of heat by direct sunlight and low $T_{vis}$ values which gives the low SHGC value when the laminate is heated by direct sunlight.

Often, laminated glass is produced by using two panes of annealed glass with an interlayer including silicone, PVB, EVA, TPU, or ionomeric polymers. We have found that interlayers comprising NIR-absorbing materials, particularly CTB or CWO nanoparticles are not well suited for use with annealed glass. These annealed glass laminates containing nanoparticle-loaded interlayers have a propensity to crack or break when they are heated, especially when heated non-uniformly by sunlight exposure. Substituting heat-treated glass for the annealed glass in the laminates results in laminates that are very resistant to heat-induced cracking or breaking, as illustrated in the example described below to compare the durability of a laminate prepared using annealed glass to a laminate prepared using heat-strengthened glass.

A NIR-absorbing PVB interlayer was prepared by extrusion through a 6 inch slot die utilizing a C. W. Brabender (Hackensack, N.J.) Intellitorque 7150 conical twin screw extruder. The composition of the interlayer was as follows: 0.06 weight % CTB in 220 parts tri(ethylene glycol) bis(2-ethylhexanoate) and 450 parts PVB resin. The extruded interlayer was about 400 microns thick. Three laminates (Laminates 1, 2, and 3) were prepared, where Laminates 1 and 2 included annealed glass, and Laminate 3 included sheets of heat strengthened glass with a surface compressive stress between 3,500 and 7,000 psi. The laminates were prepared by laying two sheets of the interlayer side by side on 12 inch by 12 inch sheets of glass and processing in a vacuum bag lamination process with a maximum processing temperature of 140° C. Laminates 1 and 2 were each prepared with two 12 inch by 12 inch sheets of 3 millimeter annealed, clear, soda lime glass, and Laminate 3 was prepared with two 12 inch by 12 inch sheets of 3 millimeter thick heat-strengthened, clear, soda lime glass.

Each of Laminates 1, 2, and 3 was placed 5 inches from a 700 W halogen lamp equipped with a 5 millimeter thick soda lime glass filter. The amount of time required for the laminates to crack or break under these conditions was recorded. Also, the temperature of the laminate at the end of each trial was recorded. For Laminate 1, one sheet of glass in the laminate cracked after an exposure of 6.7 minutes, and the second sheet of glass cracked after 7.0 min total exposure time. The temperature of sample 1 after 7.00 min exposure was 115° C. For Laminate 2, both sheets of glass cracked after 8.6 min exposure. The temperature of sample 2 after 8.6 min exposure was 125° C. Laminate 3 was exposed for 80 min without any cracks or breaks developing. The temperature of the Laminate 3 after 80 minutes of exposure was 182° C.

Although the invention is shown and described with respect to certain embodiments, it should be clear that modifications will occur to those skilled in the art upon reading and understanding the specification, and the present invention includes all such modifications.

What is claimed is:

1. A thermochromic, near infrared (NIR) absorbing interlayer comprising:
   NIR-absorbing substance dispersed or dissolved in a polymer matrix; and
   a thermochromic material or system;
   wherein the interlayer has an internal visible light transmission above 50% and an internal solar energy transmission below 55% when the interlayer is at 15° C. and an internal visible light transmission below 20% and an internal solar energy transmission below 20% when the interlayer is at 75° C., and wherein the internal haze of the interlayer is below 3.5%.

2. The interlayer of claim 1, comprising NIR-absorbing substances dispersed in the polymer matrix and NIR-absorbing substances dissolved in the polymer matrix, wherein the NIR-absorbing substances dispersed in the polymer matrix comprise cesium and tungsten.

3. The interlayer of claim 1, wherein the NIR-absorbing substance comprise a tetrahalometalate nanoparticle dissolved in the polymer matrix.

4. The interlayer of claim 3, wherein the tetrahalometalate comprises tetrabromonickelate (NiBr42-), tetrabromocobaltate (CoBr42-), tetraiodocobaltate (CoI42-), or a combination thereof.

5. The interlayer of claim 4, comprising 0.1 gram to 10 grams of the tetrahalometalate per square foot of interlayer.

6. The interlayer of claim 1, wherein the thermochromic material or system is a ligand exchange thermochromic material or system.

7. The interlayer of claim 1, wherein the thermochromic material or system comprises nickel ions and bromide ions.

8. The interlayer of claim 1, further comprising one or more additives selected from the group comprising a UV absorber, a UV stabilizer, a hindered amine light stabilizer, an antioxidant, a thermal stabilizer, an adhesion promoting agent, and an adhesion inhibiting agent.

9. The interlayer of claim 1, further comprising a plasticizer.

10. The interlayer of claim 1, wherein at least one surface of the interlayer has a surface roughness $R_z$ value between about 5 microns and about 150 microns.

11. The interlayer of claim 1, wherein the interlayer further comprises a color suppression additive.

12. The interlayer of claim 1, wherein the polymer matrix comprises polyvinylbutyral or poly(vinyl butyral-co-vinyl alcohol-co-vinyl acetate).

13. The interlayer of claim 1, wherein the interlayer comprises a laminate of a plurality of layers.

14. The interlayer of claim 13, wherein the plurality of layers comprise a first thermochromic layer, a second thermochromic layer, and a separator layer between the first and second thermochromic layers.

15. The interlayer of claim 14, wherein the separator layer comprises the NIR-absorbing substance.

16. The interlayer of claim 14, wherein the separator layer comprises polyethylene terephthalate, an acrylic, or a multilayer alternating refractive index (MLARI) film.

17. The interlayer of claim 16, wherein the MLARI film comprises an NIR-absorbing tetrahalometalate.

18. The interlayer of claim 13, wherein the interlayer is an acoustic interlayer.

19. The interlayer of claim 1, wherein the interlayer has a maximum water or moisture content of about 1% by weight of water compared to the total weight of the interlayer.

20. The interlayer of claim 1, wherein the interlayer is at least a portion of an after-market film adapted for attachment to one or more sheets of plastic or glass.

21. A laminate comprising:
an interlayer comprising an NIR-absorbing substance dispersed or dissolved in a polymer matrix;
a first sheet of plastic or glass; and
a second sheet of plastic or glass;
wherein the interlayer is bonded between the first sheet and the second sheet, wherein at least one of the first sheet and the second sheet is coated with a low-e coating, and wherein at the laminate has a visible light transmission above 70% and a total solar transmission below 35%.

22. The laminate of claim 21, wherein the interlayer comprises NIR-absorbing substances dispersed in the polymer matrix and NIR-absorbing substances dissolved in the polymer matrix of the interlayer, and wherein the NIR-absorbing substance dispersed in the polymer matrix comprises cesium and tungsten.

23. The laminate of claim 21, wherein the NIR-absorbing substance comprises a tetrahalometalate nanoparticle dissolved in the polymer matrix of the interlayer.

24. The laminate of claim 23, wherein the tetrahalometalate comprises tetrabromonickelate (NiBr42-), tetrabromocobaltate (CoBr42-), tetraiodocobaltate (CoI42-), or a combination thereof.

25. The laminate of claim 21, wherein the interlayer comprises a thermochromic material or system.

26. The laminate of claim 25, wherein the interlayer comprises a ligand exchange thermochromic material or system.

27. The laminate of claim 21, wherein the interlayer comprises a color suppression additive.

28. The laminate of claim 21, wherein the interlayer comprises a plurality of layers.

29. The laminate of claim 27, wherein the plurality of layers comprise a first thermochromic layer, a second thermochromic layer, and a separator layer between the first and second thermochromic layers.

30. The laminate of claim 28, wherein the separator layer comprises the NIR-absorbing substance.

31. The laminate of claim 29, wherein the separator layer comprises a MLARI film and wherein the NIR-absorbing substance comprises a tetrahalometalate.

32. The laminate of claim 21, wherein the interlayer is an acoustic interlayer.

33. The laminate of claim 21, wherein the first sheet and the second sheet each comprise sheets of strengthened glass.

34. The laminate of claim 33, wherein the sheets of strengthened glass are mildly heat strengthened, heat strengthened, tempered, edge treated, chemically strengthened, or combinations thereof.

35. The laminate of claim 33, wherein at least one of the sheets of strengthened glass is mildly heat strengthened to a surface compressive strength of between about 1,000 psi and 3,500 psi.

36. The laminate of claim 33 wherein at least one of the sheets of strengthened glass is heat strengthened to a surface compressive strength of at least 3,500 psi.

37. The laminate of claim 33, wherein at least one of the sheets of glass has a linear thermal expansion coefficient between about $4 \times 10^{-6}$/K and about $1 \times 10^{-7}$/K.

38. The laminate of claim 33, wherein both the first and second sheets of plastic or glass are sheets of bent glass.

39. The laminate of claim 38, wherein both the sheets of bent glass both include hard coat low-e coatings.

40. The laminate of claim 38, wherein the interlayer, prior to lamination, has a surface roughness on at least one side of between about 5 microns to about 150 microns.

41. The laminate of claim 33, wherein at least one of the sheets of glass includes a self-cleaning layer.

42. The laminate of claim 21, wherein the laminate is at least a portion of a vehicle window, windshield, or sunroof.

43. The laminate of claim 21, wherein the interlayer comprises a UV barrier.

44. A laminate comprising:
an interlayer comprising an NIR-absorbing substance dispersed or dissolved in a polymer matrix and a thermochromic material or system;
a first sheet of heat strengthened glass; and
a second sheet of heat strengthened glass;
wherein the interlayer is bonded between the first sheet and the second sheet.

45. The laminate of claim 44, wherein at least one of the first and second sheets includes a hard coat low-e coating.

46. The laminate of claim 44, wherein the interlayer comprises an NIR-absorbing substance dispersed in the polymer matrix and a second NIR-absorbing substance dissolved in the polymer matrix of the interlayer, and wherein the NIR-absorbing substance dispersed in the polymer matrix comprise cesium and tungsten.

47. The laminate of claim 44, wherein the second NIR-absorbing substance comprises a tetrahalometalate dissolved in the polymer matrix of the interlayer.

48. The laminate of claim 47, wherein the tetrahalometalate comprises tetrabromonickelate (NiBr42-), tetrabromocobaltate (CoBr42-), tetraiodocobaltate (CoI42-), or a combination thereof.

49. The laminate of claim 44, wherein the thermochromic material or system is a ligand exchange thermochromic material or system.

50. The laminate of claim 44, wherein the interlayer comprises a color suppression additive.

51. The laminate of claim 44, wherein the interlayer comprises a plurality of layers, and wherein the plurality of layers include a first thermochromic layer, a second thermochromic layer, and a separator layer between the first and second thermochromic layers.

52. The laminate of claim 51, wherein the separator layer comprises the NIR-absorbing substance.

53. The laminate of claim 51, wherein the separator layer comprises a MLARI film and wherein the an NIR-absorbing substance comprises a tetrahalometalate.

54. The laminate of claim 44, wherein both the first and second sheets are sheets of bent glass.

55. The laminate of claim 44, wherein the interlayer is an acoustic interlayer.

56. The laminate of claim 44, wherein the interlayer comprises a UV barrier.

* * * * *